(12) United States Patent
Ballantyne et al.

(10) Patent No.: US 9,226,125 B2
(45) Date of Patent: Dec. 29, 2015

(54) METHOD AND APPARATUS FOR ALERT MESSAGE RECEPTION

(71) Applicant: MOTOROLA MOBILITY LLC, Libertyville, IL (US)

(72) Inventors: Wayne W. Ballantyne, Coconut Creek, FL (US); Dwight R. Smith, Grapevine, TX (US); Jerome Vogedes, Milwaukee, WI (US); Jian Jun Wu, Reading (GB)

(73) Assignee: Google Technology Holdings LLC, Mountain View, CA (US)

( * ) Notice: Subject to any disclaimer, the term of this patent is extended or adjusted under 35 U.S.C. 154(b) by 234 days.

(21) Appl. No.: 13/802,897

(22) Filed: Mar. 14, 2013

(65) Prior Publication Data

US 2014/0273910 A1 Sep. 18, 2014

(51) Int. Cl.
*H04W 4/22* (2009.01)
(52) U.S. Cl.
CPC ..................................... *H04W 4/22* (2013.01)
(58) Field of Classification Search
CPC ....... H04W 4/22; H04W 76/007; H04W 4/06; H04W 4/02
USPC ...................................................... 455/404.1
See application file for complete search history.

(56) References Cited

U.S. PATENT DOCUMENTS

| 5,950,127 A | | 9/1999 | Nitta et al. | |
|---|---|---|---|---|
| 7,194,249 B2 | * | 3/2007 | Phillips et al. | 455/404.1 |
| 7,844,286 B1 | | 11/2010 | Sennett et al. | |
| 8,027,659 B1 | * | 9/2011 | Daly et al. | 455/404.1 |
| 8,244,205 B2 | | 8/2012 | Wu | |
| 8,291,011 B2 | * | 10/2012 | Abu-Hakima et al. | 709/203 |
| 8,798,641 B2 | * | 8/2014 | Persson | 455/456.1 |
| 2002/0160745 A1 | * | 10/2002 | Wang | 455/404 |
| 2002/0194170 A1 | | 12/2002 | Israni et al. | |
| 2007/0021051 A1 | | 1/2007 | Choi et al. | |
| 2008/0032666 A1 | * | 2/2008 | Hughes et al. | 455/404.1 |
| 2008/0039048 A1 | | 2/2008 | Turri et al. | |
| 2009/0239497 A1 | * | 9/2009 | Sennett et al. | 455/404.1 |
| 2009/0247111 A1 | * | 10/2009 | Sennett et al. | 455/404.1 |
| 2009/0247116 A1 | * | 10/2009 | Sennett et al. | 455/404.2 |
| 2009/0325538 A1 | * | 12/2009 | Sennett et al. | 455/404.2 |

(Continued)

FOREIGN PATENT DOCUMENTS

| EP | 2082385 B1 | 1/2012 |
|---|---|---|
| GB | 2382265 A | 5/2003 |
| WO | 2008059285 A1 | 5/2008 |

OTHER PUBLICATIONS

Gabor Bajko: "Emergency Alert Service Support in IEEE 802.11 Networks", draft-bajko-atoca-wlan-eas-01, Atoca WG, Nokia, Internet Draft, Oct. 31, 2011, all pages.

(Continued)

*Primary Examiner* — Nathan Mitchell
(74) *Attorney, Agent, or Firm* — Morris & Kamlay LLP

(57) ABSTRACT

A method can include communicating with a base station of a cellular network. The method can include establishing a data connection with an alternate network with internet protocol connectivity, where the alternate network is an alternate to cellular networks. The method can include requesting, over the alternate network, public warning system messages based on a cellular public warning system message protocol, where the requested public warning system messages are identified as public warning system messages sent by the base station.

32 Claims, 17 Drawing Sheets

(56) References Cited

U.S. PATENT DOCUMENTS

| | | |
|---|---|---|
| 2010/0124898 A1 | 5/2010 | Qu et al. |
| 2010/0189027 A1 | 7/2010 | Ishida et al. |
| 2011/0053588 A1* | 3/2011 | Al-Khudairi et al. ......... 455/424 |
| 2011/0128865 A1 | 6/2011 | Doppler et al. |
| 2011/0280231 A1 | 11/2011 | Montemurro et al. |
| 2011/0282961 A1 | 11/2011 | Montemurro et al. |
| 2011/0319073 A1 | 12/2011 | Ekici et al. |
| 2012/0076118 A1 | 3/2012 | Montemurro et al. |
| 2012/0289147 A1 | 11/2012 | Raleigh et al. |
| 2013/0155954 A1 | 6/2013 | Wang et al. |
| 2014/0204932 A1 | 7/2014 | Rudolf et al. |

OTHER PUBLICATIONS

McCann, Stephen: "Emergency Alert System Update", IEEE P802.11 Wireless LANs, doc.: IEEE 802.11-08/0078r3, Jan. 2008, all pages.

Gabor Bajko: "EAS Retrieval", IEEE P802.11 Wireless LANs, doc.: IEEE 802.11-10/0xxx, Jan. 2010, all pages.

International Search Report and Written Opinion issued Jun. 18, 2014 in corresponding International Application No. PCT/US2014/023986.

International Search Report and Written Opinion issued Jun. 18, 2014 in corresponding International Application No. PCT/US2014/019337.

\* cited by examiner

METHOD AND APPARATUS FOR ALERT MESSAGE RECEPTION

CROSS-REFERENCE TO RELATED APPLICATIONS

This application is related to an application entitled "Method and Apparatus for Alert Message Reception," U.S. application Ser. No. 13/802,869, an application entitled "Method and Apparatus for Alert Message Reception," U.S. application Ser. No. 13/802,928, and an application entitled "Method and Apparatus for Alert Message Reception," U.S. application Ser. No. 13/803,191, filed on even date herewith, commonly assigned to the assignee of the present application, and hereby incorporated by reference.

BACKGROUND

1. Field

The present disclosure is directed to a method and apparatus for alert message reception. More particularly, the present disclosure is directed to receiving cellular public warning system messages or other messages at user equipment.

2. Introduction

User equipment, cell phones, smart phones, tablet computers, personal digital assistants, personal computers, and other user equipment, can operate on cellular networks, Wireless Local Area Networks (WLAN) such as those based on the IEEE 802.11 standard, and other networks. When operating on a cellular network, Commercial Mobile Alerting System (CMAS)-capable user equipment can receive CMAS messages. CMAS is an opt-out system that sends CMAS alerts, such as Presidential, Extreme, Severe, and Amber alerts, to user equipment. By default, CMAS-capable user equipment can receive all types of CMAS alerts, but the user can opt out, via a menu, of the Extreme, Severe, and Amber alerts; receive capability for the Presidential alert is mandatory. CMAS alerts are geo-targeted by the carriers of cellular networks, with cell-level granularity, based on coverage area indicators sent by a government entity originating the alert. Such government entities can include the National Oceanic and Atmospheric Administration (NOAA), the Federal Emergency Management Agency (FEMA), the Department of Defense (DOD), the President of the United States, the National Weather Service (NWS), and other government entities. The CMAS alerts provide timely and accurate alerts, warnings, and critical information regarding disasters and other emergencies.

User equipment can only receive CMAS alerts over a cellular network. This means that user equipment that connects to a WLAN and disconnects from a cellular network cannot receive the alerts. Furthermore, user equipment that operates only on WLANs cannot receive the CMAS alerts. This also holds true for user equipment that are cellular network-capable, but do not have cellular network coverage. For example, a cellular network-capable user equipment may power up in a location where a WLAN is available and the user equipment may connect to the WLAN without connecting to a cellular network. Alternately, the user equipment may be configured to prefer a WLAN connection even when cellular network coverage is available. The user equipment may still make calls using Voice over Internet Protocol (VoIP) over the WLAN, but if it does not connect to the cellular network, the user equipment will not receive CMAS alerts.

Other regions of the world have, or will have, similar systems to CMAS, such as the Earthquake/Tsunami Warning System (ETWS) in Japan, the European Union EU-Alert system in Europe, and the Korean Public Alert System (KPAS) in Korea. In 3rd Generation Partnership Project (3GPP) standards, common requirements for these systems are covered by Public Warning System (PWS) specifications. These systems also cannot send warning messages over a WLAN.

To elaborate on one example, when user equipment has a WLAN-only mode, cellular network carriers can require or encourage the user equipment to switch to a WLAN-only mode to reduce data traffic over the cellular network. These carriers have, or are planning to deploy, trusted WLAN networks in malls, enterprises, airports, and other locations as the carriers strive to offload data to WLAN. User equipment voice services are then conducted over WLAN using, by example, an Internet Protocol (IP) Multimedia Subsystem (IMS) client on the user equipment by re-registering with an IMS network after reselection to WLAN occurs. Alternately, the user may prefer a non-IMS VoIP client such as Skype, which can operate on any wireless or wired data network. The UE can then de-attach from the cellular network while in WLAN mode to improve battery life and data throughput. Unfortunately, this leaves the user exposed to the inability to receive CMAS alerts while in WLAN mode. In order to avoid this incapability, the user equipment may, while using WLAN for data and VoIP, leave the cellular modem registered to the cellular network solely for the purpose of receiving CMAS alerts. This arrangement wastes power, and also may create RF interference scenarios on the user equipment when both the cellular and WLAN transceivers are simultaneously active.

Thus, there is a need for an improved method and apparatus for alert message reception.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. These drawings depict only typical embodiments of the disclosure and are not therefore to be considered to be limiting of its scope.

DETAILED DESCRIPTION

Figure 1:
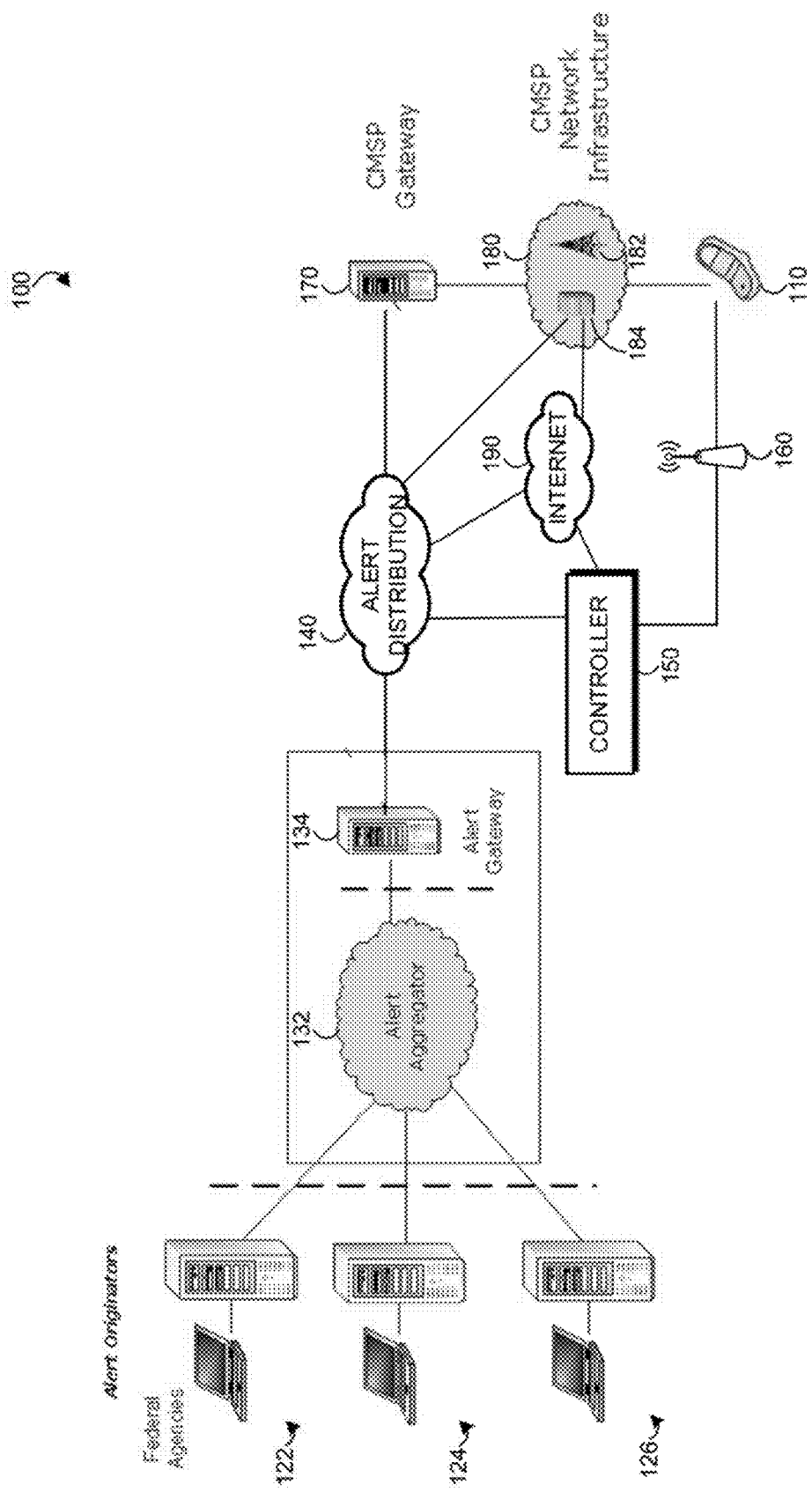
FIG. 1 is an example block diagram of a public warning alert system according to a possible embodiment.

Embodiments provide a method and apparatus for alert message reception.

According to a possible embodiment, a method can include operating on a cellular network. The method can include receiving, from the cellular network, a public warning system message at a user equipment. The method can include detecting an available alternate network with internet protocol connectivity, where the alternate network is an alternate to cellular networks. The method can include delaying switching operation from the cellular network to the available alternate network for a predetermined period of time after receiving the public warning system message. The method can include switching operation from the cellular network to the available alternate network after delaying switching operation.

According to a possible embodiment, a method can include communicating with a base station of a cellular network, and storing base station parameters in memory. The method can include detaching from then cellular network, then establishing a data connection with an alternate network with internet protocol connectivity, where the alternate network is an alternate to cellular networks. The method can include requesting, over the alternate network, public warning system messages based on a cellular public warning system message protocol, where the requested public warning system messages are identified as equivalent to public warning system messages sent by the base station.

According to a possible embodiment, a method can include collecting public warning system messages that are to be transmitted over a wireless local area network. The method can include identifying one or more public warning system messages of the collected public warning system messages as a message relevant to a service area of the wireless local area network. The method can include transmitting the one or more identified public warning system messages over the wireless local area network via group transmission, where the group transmission transmits the identified public warning system message to a group of recipients using group addressed messages.

According to a possible embodiment, a method can include connecting to a wireless local area network access point. The method can include receiving an enhanced broadcast indication message of a plurality of enhanced broadcast indication messages that indicate a delivery time and an identifier of a future broadcast message. The method can include scheduling a time to receive the future broadcast message following a future delivery traffic information message beacon based on information in the enhanced broadcast indication message.

According to a possible embodiment, a method can include receiving broadcast messages for transmission over a wireless local area network. The method can include identifying one or more broadcast message relevant to a service area of the wireless local area network. The method can include repeatedly transmitting an enhanced broadcast indication message that indicates a delivery time and an identifier of a future broadcast message. The method can include broadcasting the identified future broadcast message over a wireless local area network access point following the indicated delivery time after repeatedly transmitting the enhanced broadcast indication message.

FIG. 1 is an example block diagram of a system 100 according to a possible embodiment. The system 100 can include a user equipment (UE) 110, alert originators 122, 124, and 126, an alert aggregator 132, an alert gateway 134, an alert distribution network 140, a network controller 150, an access point 160, a Commercial Mobile Service Provider (CMSP) gateway 170, a CMSP cellular network infrastructure 180, and a network 190, such as the Internet. The CMSP network infrastructure 180 includes a CMSP controller 184 and at least one base station 182. The CMSP controller 184 can provide services for the CMSP network 180, can act as a web server for the network 180, or can provide other functionality for the CMSP network 180.

The user equipment 110 may be a wireless terminal. For example, the user equipment 110 can be a wireless communication device, a wireless telephone, a cellular telephone, a personal digital assistant, a personal computer, a tablet computer, or any other device that is capable of sending and receiving communication signals on a wireless network.

The network controller 150 can be a WLAN network controller that can connect to the access point 160 to the Internet 190, can connect to other networks and devices, and can perform operations for controlling a WLAN including the access point 160. The network controller 150 can be located proximal to the access point 160 or elsewhere on a WLAN. The network controller 150 may also have elements located at a base station, at a radio network controller, or anywhere else on a network. The network 140 can include any type of network that is capable of sending and receiving communication signals. For example, the network 140 can include the Internet, an Internet Protocol (IP) network, a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, and other communications systems. Furthermore, the network 140 may include more than one network and may include a plurality of different types of networks. Thus, the network 140 may include a plurality of data networks, a plurality of telecommunications networks, a combination of data and telecommunications networks and other like communication systems capable of sending and receiving communication signals.

The alert originators 122, 124, and 126 can include federal agencies 122, Emergency Operation Centers 124, and/or other alert originators 126. The alert originators issue public warning system messages for the user equipment 110 through the alert aggregator 132, the alert gateway 134, the network 140, the network controller 150, the access point 160, the CMSP gateway 170, and the CMSP infrastructure 180. Public warning system messages can be a Public Warning System (PWS) messages, Commercial Mobile Alert System (CMAS) messages, Earthquake and Tsunami Warning Service (ETWS) messages, Emergency Alert System (EAS) messages, National Warning System (NAWAS) messages, National Oceanic and Atmospheric Administration (NOAA) Weather Radio All Hazards messages, Korean Public Alert System (KPAS) messages, Personal Localized Alert Network (PLAN) messages, Wireless Emergency Alert (WEA) messages, and other public warning system messages based on a cellular public warning system message protocol. For example, public warning system messages include Presidential, Extreme, Severe, Amber Alert, and other public warning system messages. The public warning system message include a type of event addressed by the public warning system message, include an area affected by the event or message, include an expiration time of the message, include a suggestion action for or response by a user, include an identification of the originator of the message, and/or include other useful information. Some alert originators can also issue other alert messages. For example, the other alert originators 126 can include commercial operations, retail services, airports, sports networks, or other alert originators. The other alert originators 126 can issue alert messages such as sales notices, gate change notices, sports updates, and other alert messages.

The access point 160 is an access point to an available alternate network that is an alternate to cellular networks, such as the CMSP 180. For example, an available alternate network can be an available wireless local area network, a network with a local access point, a wireless personal area network, a Bluetooth® connection to a network, a campus area network, or any other wireless local area network. User equipment can connect to an alternate network using a wireless connection, using a wired connection, using an optical connection, using a connection through an intermediate device, or using any other connection to a network that is an alternate network to cellular networks.

Figure 2:
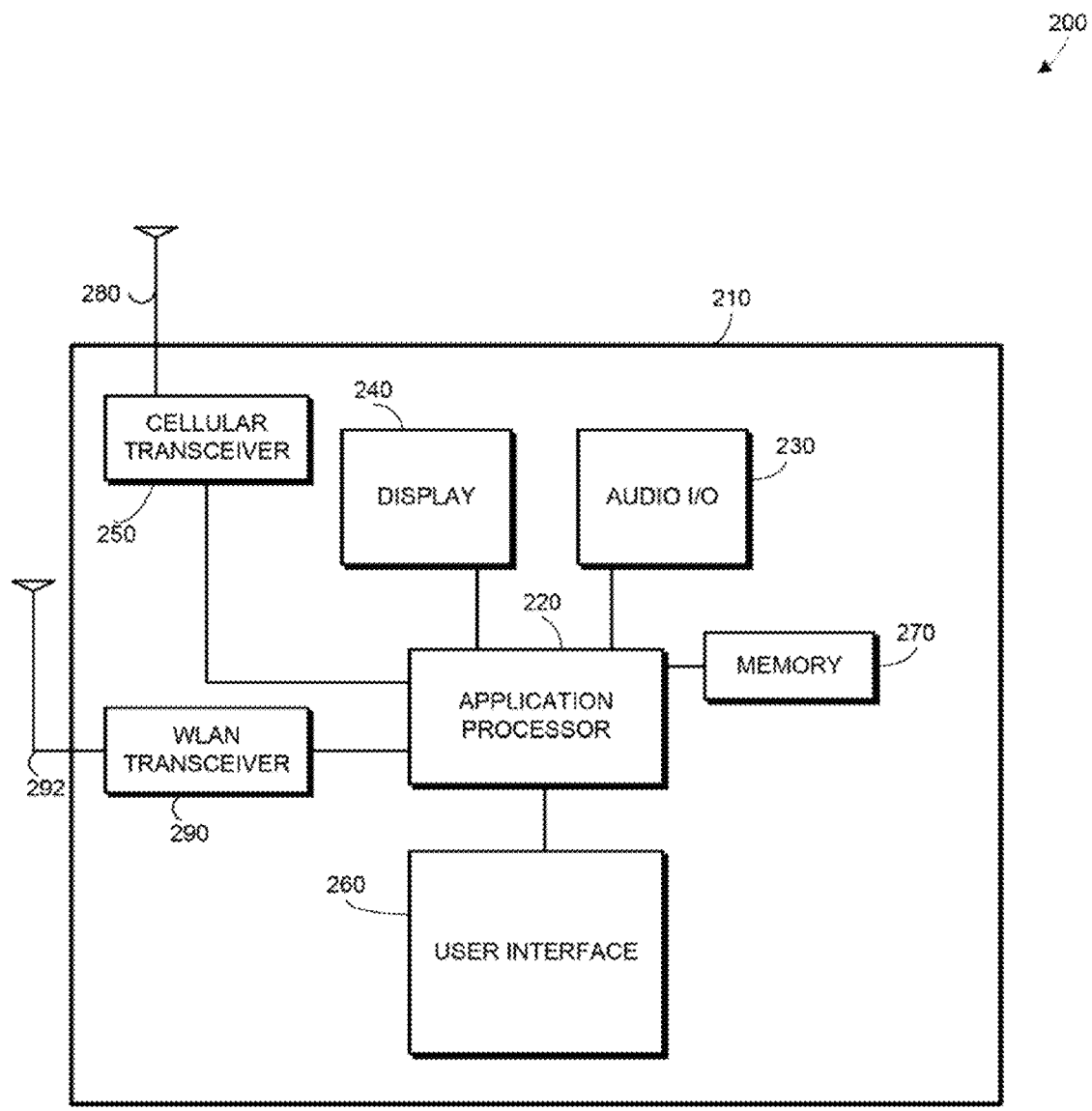
FIG. 2 is an example block diagram of user equipment according to a possible embodiment.

FIG. 2 is an example block diagram of a user equipment 200, such as the user equipment 110, according to a possible embodiment. The user equipment 200 can include a housing 210, an application processor 220 within the housing 210, audio input and output circuitry 230 coupled to the application processor 220, a display 240 coupled to the application processor 220, a first transceiver 250 coupled to the application processor 220, a first antenna 280 coupled to the first transceiver 250, a second transceiver 290 coupled to the application processor 220, a second antenna 292 coupled to the second transceiver 290, a user interface 260 coupled to the application processor 220, and a memory 270 coupled to the application processor 220.

The display 240 can be a liquid crystal display (LCD), a light emitting diode (LED) display, a plasma display, a projection display, a touch screen, or any other device for displaying information. The transceivers 250 and 290 may include transmitters and/or receivers. The transceiver 250 can be a cellular transceiver that operates on a cellular network. The transceiver 290 can be an alternate network transceiver that operates on an alternate network, such as a WLAN, an 802.11 network, a satellite network, or any other network that is an alternate to cellular networks. The audio input and output circuitry 230 can include a microphone, a speaker, a transducer, or any other audio input and output circuitry. The user interface 260 can include a keypad, buttons, a touch pad, a joystick, a touch screen display, another additional display, or any other device useful for providing an interface between a user and an electronic device. The memory 270 can include a random access memory, a read only memory, an optical memory, a subscriber identity module memory, or any other memory that can be coupled to a wireless communication device. The user equipment 200 can perform the methods described in all the embodiments.

According to one possible embodiment, the first transceiver 250 operates on a cellular network. The application processor 220 can receive, from the cellular network via the transceiver 250, a public warning system message. The application processor 220 can detect an available alternate network using the second transceiver 290. The application processor 220 can delay switching operation from the cellular network to the available alternate network for a predetermined period of time after receiving the public warning system message, and reselect from the cellular network to the available alternate network after delaying switching operation. An alternate network can be an alternate to cellular networks by using different signaling protocols from cellular networks, by using different transmission frequencies from cellular networks, by using a different network layout and admission policy than cellular networks, and can otherwise be an alternate to cellular networks. In one possible embodiment, the alternate network is a WLAN network operating per the IEEE 802.11 standards. The predetermined period of time can be defined at the user equipment 200 or by a cellular network operator.

Switching operation can include reselecting from the cellular network to the available alternate network, handing over from the cellular network to the available alternate network, or otherwise switching operation from the cellular network to the available alternate network. For example, the user equipment 200 can reselect operation while in idle mode and can control the change to a new base station or access point. As another example, the user equipment 200 can hand over operation while in a connected state. When handing over, a base station 182 can direct the user equipment 200 to hand over operation to another base station or to an access point 160.

The public warning system message can be a first public warning system message. The application processor 220 can receive, from the cellular network, a second public warning system message after receiving the first public warning system message and can delay switching operation from the cellular network to the available alternate network for another predetermined period of time after receiving the second public warning system message.

The application processor 220 can start a switching operation delay countdown timer in response to receiving the public warning system message and can delay switching operation until the switching operation delay countdown timer has reached a predetermined value. For example, the switching operation delay countdown timer can be initialized to a predetermined start value and switching operation can be delayed until the timer counts down to zero or to another predetermined value.

The application processor 220 can also receive, from the cellular network, a second public warning system message after receiving the first public warning system message and can restart the switching operation delay countdown timer after receiving the second public warning system message. The application processor 220 can also determine that cellular network coverage has been lost and can switch operation from the cellular network to the available alternate network in response to determining that cellular network coverage has been lost, even if the switching operation delay countdown timer has not expired.

The application processor 220 can connect to the available alternate network while maintaining connectivity to the cellular network after detecting the available alternate network and can switch operation from the cellular network to the available alternate network by disconnecting from the cellular network after delaying switching operation and by establishing a connection with the available alternate network.

The application processor 220 can delay switching operation by delaying handing over of the user equipment 200 from the cellular network to the available alternate network for a period of time after receiving the public warning system message from the cellular network and can switch operation by handing over operation of the user equipment 200 from the cellular network to the available alternate network after delaying handing over. Handing over can be performed by connecting to the available alternate network and disconnecting from the cellular network.

Referring back to FIG. 1, as a further example, if the user equipment 110 is initially in CMSP coverage, such as LTE coverage, and an accessible access point 160, such as an access point for a WLAN network, becomes available, the user equipment 110 can delay WLAN reselection if recent CMAS messages were received. This can be tracked by the user equipment 110 using a CMAS recency timer $T_{CMAS}$. The recency timer can be a countdown timer that can be initialized to a predetermined value, $T_{INIT}$, such as 15 to 60 minutes, when the first CMAS alert is received. While the recency timer is active, such as non-zero, reselection to WLAN can be delayed. If a new CMAS alert is received while the user equipment 110 is still in LTE coverage, $T_{CMAS}$ can be re-initialized back to $T_{INIT}$. Once the recency timer expires, or if LTE coverage fails, the user equipment 110 can reselect to WLAN.

The user equipment 110 can use the recency timer to delay a handover to a WLAN only mode, but before the timer expires, the user equipment 110 can maintain connectivity with both the CMSP network 180 and the WLAN network. The user equipment 110 can then receive CMAS messages over the CMSP network 180. Thus, the user equipment 110 can connect to a WLAN network and also maintains LTE connectivity. This can allow user equipment 110 data traffic to be moved to WLAN.

Referring back to FIG. 2, according to another related embodiment, the transceiver 250 communicates with a base station of a cellular network. The application processor 220 can establish a data connection with an alternate network with internet protocol connectivity, where the alternate network can be an alternate to cellular networks. The application processor 220 can retrieve a cell identifier of the base station before switching from the base station to an access point of the alternate network and can retain the retrieved cell identifier while attached to the alternate network. The application processor 220 can request, over the alternate network, public warning system messages based on a cellular public warning system message protocol. The requested public warning system messages can be identified as public warning system messages sent by the base station.

The application processor 220 can request public warning system messages by sending a query over the alternate network for public warning system messages that correspond to the base station, where the query includes a cell identifier of the base station. For example, the application processor 220 can send a query to a CMSP web server at the CMSP controller 184. The query can include a uniform resource identifier (URI) that includes the cell identifier of the base station. For example, the query can include a query address including a country code, a network operator code, and a base station identifier such as a Global Cell Identifier (GCI). The application processor 220 can store cell identifiers of previous serving base stations along with alternate network identifiers corresponding to the cell identifiers of the previous serving base stations.

The application processor 220 can receive, from the cellular network, such as from the CMSP web server 184, a resource identifier for public warning system messages, where the requested public warning system messages are identified using the received resource identifier. Alternately, the URI can be pre-provisioned in the memory 270. The application processor 220 can also receive from the cellular transceiver 250 a data field that identifies the base station, including the country code, a network operator code, and a base station identifier such as a Global Cell Identifier. These can be used by 220 to generate a resource identifier such that the requested public warning system messages can be identified and retrieved using the generated resource identifier.

The application processor 220 can request public warning system messages by sending multiple queries at a frequency based on a public warning system message recency timer. For example, the application processor 220 can receive a public warning system message corresponding to the base station. The application processor 220 can start a public warning system message retrieval countdown timer in response to receiving the public warning system message. The application processor 220 can request, over the alternate network, public warning system messages that correspond to the base station at a first interval while the countdown timer is active and can request public warning system messages by requesting public warning system messages that correspond to the base station at a second interval while the countdown timer is inactive. The application processor 220 can request the public warning system messages from a server hosted by the CMSP or from some other server. For example, the application processor 220 can request public warning system messages by sending a first query after a first time period after switching from the base station to an access point of the alternate network and by sending a second query after a second time period after sending the first query, where the second time period is longer than the first time period. The application processor 220 can request public warning system messages by sending public warning system message threshold settings that filter sent public warning system messages.

For example, referring back to FIG. 1, a user equipment 110 can access recent CMAS alerts via a dedicated CMAS web page or database query with cell granularity. The user equipment 110 can access CMAS alerts even while in WLAN mode. The user equipment 110 can hand over to WLAN. A carrier, such as a CMSP, can post CMAS messages on a web server 184 with a URL formed in a standardized manner. The posted messages can be targeted for each cell in the CMSP network 180. For example, the URL can be in the form http://CMAS/MCC-MNC/GCI, where GCI can be a 3rd Generation Partnership Project (3GPP) Global Cell Identifier (GCI), where MCC can uniquely identify a region, where MNC can identify the carrier. The user equipment 110 can automatically access the web page of the URL from the carrier's web site that would show currently active CMAS messages, or recent ones for a past predetermined amount of time, such as a predetermined number of hours, since a given CMAS message was issued. The user equipment 110 can extract, from a modem which was active with the base station 182 before the WLAN Handover, the values of MCC, MNC, and GCI.

The carrier can implement the CMAS message logging in a database, and the web page URL can be translated by the carrier into a database query that is then presented to a user. The carrier or third party can store each CMAS alert received into the database, along with a range of Cell IDs and period of applicability. The carrier can periodically purge CMAS alerts after their period of applicability has expired. Hypertext Transfer Protocol (HTTP) protocols, such as HTTP Get, can be used to retrieve the CMAS messages. If a CMAS message is available, it can be retrieved in an Extensible Markup Language (XML) format similar, or identical to, a Common Alerting Protocol (CAP) schema used for CMAS alerts over a wide area network, such as a cellular network. The CMAS alert in CAP format can be retrieved and a user can be alerted in the same manner as if the CMAS alert were received from a cellular network, such as by using a distinctive beeping cadence and a warning triangle in the upper left part of a display on the user equipment 110. If the user selects a pull-down that displays the CMAS alert, a CMAS application on the user equipment 110 can display the CMAS alert in the same manner as if a CMAS alert over were received over a cellular network. From the user's standpoint, the user interface interaction for receiving and viewing CMAS alerts can be identical whether it was received over the cellular or WLAN network. Alternately, the alert may be displayed differently to inform the user that the alert was received over a WLAN network.

The user equipment 110 can maintain a CMAS recency timer $T_{CMAS}$, with an initial value $T_{INIT}$. In this embodiment, when $T_{CMAS}$ is active, such as non-zero, it can indicate that there have been recent CMAS alerts, and the user equipment 110 can poll the carrier's CMAS web site at a frequency $C_1$, such as in a range of 0.01 to 0.1 Hz. If new CMAS alerts are received, the user equipment 110 can re-initialize $T_{CMAS}$ to $T_{INIT}$, and continue to poll at rate $C_1$. If $T_{CMAS}$ expires, the user equipment 110 can back down the CMAS web site polling rate to a lower frequency, such as $C_2$=1/600 Hz, or once every 10 minutes. The carrier can provision these rates based on data traffic, CMAS latency, user equipment current drain, and based on other factors, such as based on a function of the severity of the alert itself and/or user preferences or network settings. The web server providing these CMAS alert postings can reside in a carrier private network, but with provisions for external internet access only to its subscribers. Alternately, the carrier can choose to allow generic broadband access to the carrier's customers and non-customers.

Referring back to FIG. 2, according to another related embodiment, the transceiver 250 can connect to a wireless local area network access point. The application processor 220 can receive an enhanced broadcast indication message of a plurality of enhanced broadcast indication messages that indicate a delivery time and an identifier of a future broadcast message. The enhanced broadcast indication message can be received as part of a beacon that identifies the access point and other information. The enhanced broadcast indication message can be a first enhanced broadcast indication message indicating the delivery time and the identifier of the future broadcast message. The application processor 220 can receive a second enhanced broadcast indication message indicating the delivery time and the identifier of the same broadcast message, and can ignore the second enhanced broadcast indication message as a means to avoid duplicate message reception.

The application processor 220 can schedule a time to receive the future broadcast message associated with a future beacon based on information in the enhanced broadcast indication message. The future broadcast message can be a multicast message and the application processor 220 can send a join request to receive the multicast message. The future broadcast message can also be a public warning system message, a gate change notice message, a retail announcement, a score update, or any other broadcast message.

According to one implementation, the application processor 220 can enter a power saving mode after receiving the enhanced broadcast indication message, and can schedule a time to exit the power saving mode to receive the future broadcast message based on information in the enhanced broadcast indication message. The application processor 220 can also enter a power saving mode before receiving the enhanced broadcast indication message indicating the presence of the future broadcast message, can exit the power saving mode, and can receive the enhanced broadcast indication message indicating the delivery time and the identifier of the future broadcast message after exiting the power saving mode. Thus, a plurality of enhanced broadcast indication messages can allow the user equipment 200 to receive at least one enhanced broadcast indication message during a waking cycle of a power save mode.

According to another implementation, the application processor 220 can issue a multicast join to an address associated with a class of messages, such as different levels of public warning system message or other messages such as gate change notice message, retail or other available message. By issuing the multicast join, the application processor 220 can request the distribution network to include such messages into a broadcast stream delivered within the zone of service occupied by the application processor 220.

Figure 3:
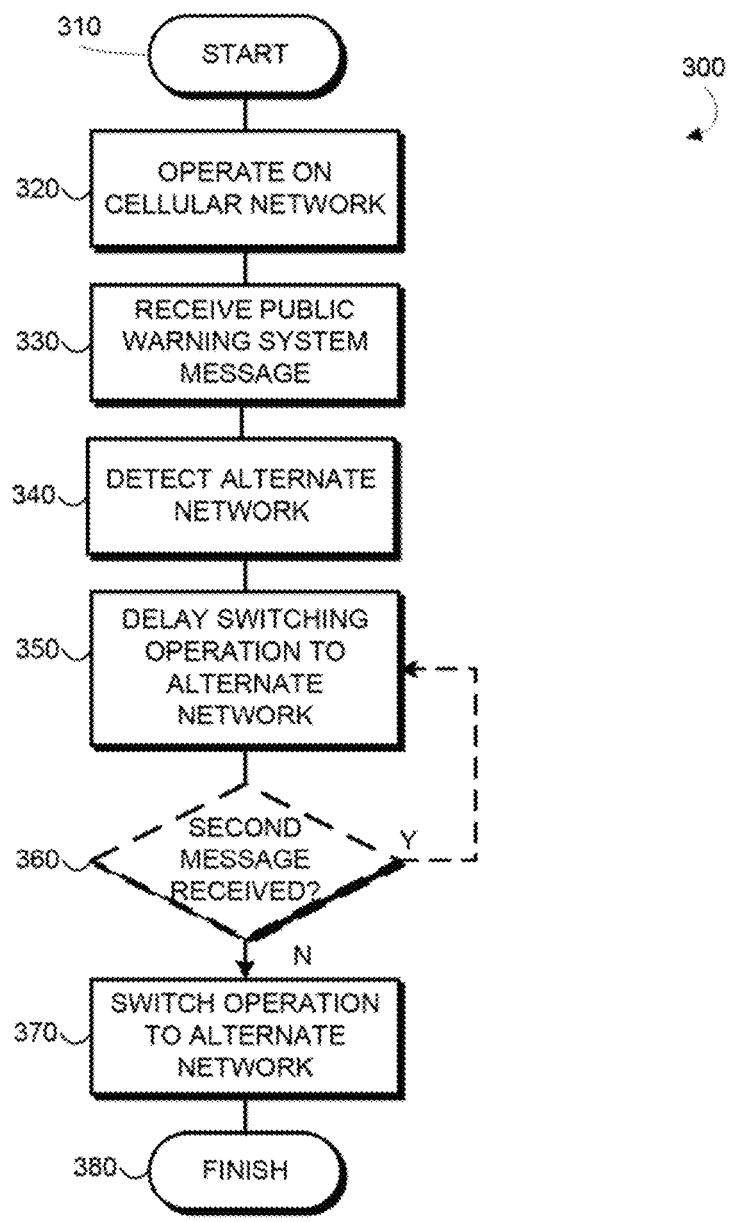
FIG. 3 is an example flowchart illustrating a method of operation of user equipment according to a possible embodiment.

FIG. 3 is an example flowchart 300 illustrating a method of operation of the user equipment 200 according to a possible embodiment. At 310, the method begins. At 320, the method can include operating on a cellular network. At 330, the method can include receiving, from the cellular network, a public warning system message at a user equipment, such as the user equipment 200. The public warning system message can be a first public warning system message.

At 340, the method can include detecting an available alternate network with internet protocol connectivity, where the alternate network is an alternate to cellular networks. The available alternate network can be an available wireless local area network can be any other available network described in the embodiments. The user equipment 200 can connect to the available alternate network while maintaining connectivity to the cellular network after detecting the available alternate network.

At 350, the method can include delaying switching operation from the cellular network to the available alternate network for a predetermined period of time after receiving the public warning system message. The predetermined period of time can be defined at the user equipment 200 and/or by a cellular network operator. Delaying can include delaying handing over of the user equipment 200 from the cellular network to the available alternate network for a period of time after receiving the public warning system message from the cellular network. For example, switching operation can be delayed by starting a switching operation delay countdown timer in response to receiving the public warning system message and by delaying switching operation until the switching operation delay countdown timer has reached a predetermined value.

At 360, the method can include determining whether a second public warning system message has been received from the cellular network after receiving the first public warning system message. If a second public warning message is received, the method can include delaying switching operation from the cellular network to the available alternate network at 350 for another predetermined period of time after receiving the second public warning system message. If a switching operation delay countdown timer is used, the switching operation delay countdown timer can be restarted.

At 370, the method can include switching operation from the cellular network to the available alternate network after delaying switching operation. Switching operation can include handing over operation of the user equipment from the cellular network to the available alternate network after delaying handing over. Handing over can be performed by connecting to the available alternate network and by disconnecting from the cellular network. The user equipment 200 can also switch operation from the cellular network to the available alternate network by disconnecting from the cellular network after delaying switching operation. The user equipment 200 can additionally switch operation from the cellular network to the available alternate network if cellular network coverage has been lost, even if the reselection delay countdown timer has not expired. At 380, the flowchart 300 can end.

Figure 4:
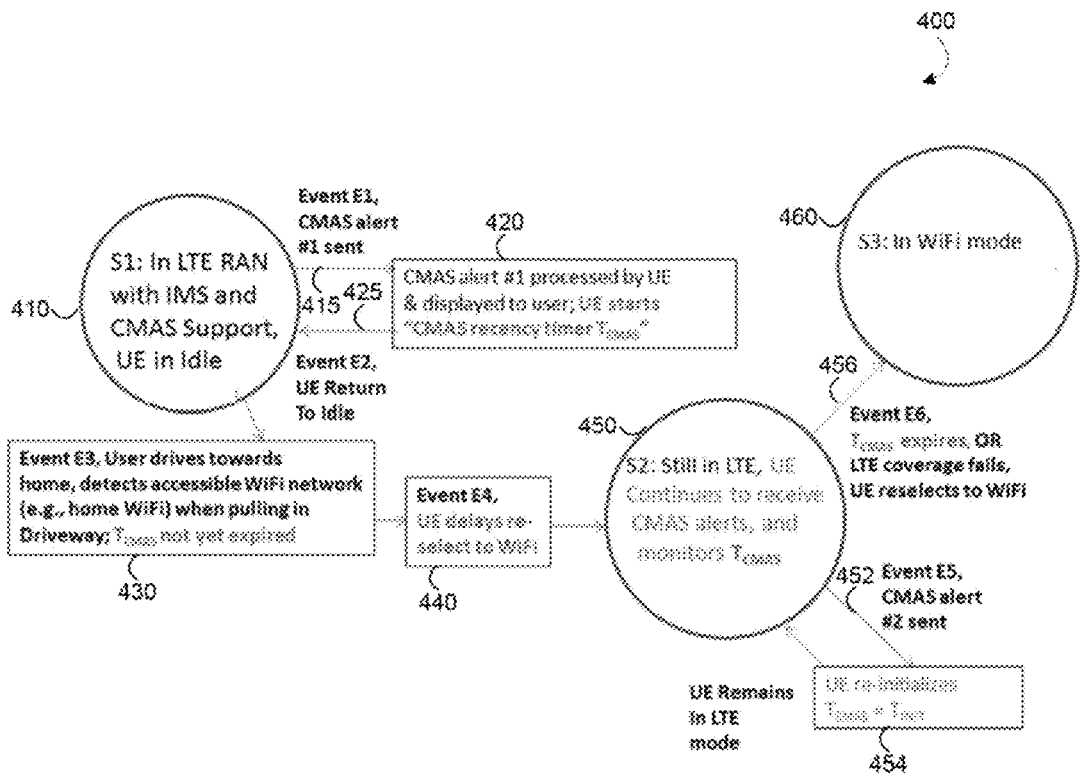
FIG. 4 is an example state diagram illustrating operation of a system according to a possible embodiment.

FIG. 4 is an example state diagram 400 illustrating operation of the user equipment 110 according to a possible embodiment. At 410, in state S1, the user equipment 110 can operate on a Long Term Evolution (LTE) Radio Access Network (RAN), such as when connected to the CMSP Network Infrastructure 180. The LTE RAN can have public warning system message, such as CMAS support. The user equipment 110 can be in idle mode or in an active state.

At 415, in event E1, a first CMAS alert can be sent by the RAN and can be received by the user equipment 110. At 420, the user equipment 110 can process and display the first CMAS alert and can start a CMAS recency timer $T_{CMAS}$. The CMAS recency timer can be a countdown timer with an initial value $T_{INIT}$, such as a value in a 20-120 minute range, as value in a 30-60 minute range, or any other useful value. The CMAS recency timer can be reset whenever a new CMAS message is received from the RAN. At 425, in event E2, the user equipment 110 can return to an idle mode or an active state.

At 430, in event E3, a user can drive home with the user equipment 110 and can detect an accessible home WLAN network, such as a network of the access point 160, when pulling into a driveway of the home while the CMAS recency timer has not yet expired. At 440, in event E4, the user equipment 110 can delay switching, such as reselection or handover, to the WLAN network.

At 450, in state S2, while still operating on the LTE RAN, the user equipment 110 can continue to receive CMAS alerts while the CMAS recency timer is still counting down. At 452, in event E5, a second CMAS alert can be sent by the RAN. At 454, the user equipment 110 can reinitialize the CMAS recency timer to the initial value $T_{INIT}$ and the user equipment 110 can remain in an LTE mode while operating on the LTE RAN. At 456, in event E6, the CMAS recency timer can expire or LTE RAN coverage can fail and the user equipment 110 can switch to the WLAN network. At 460, the user equipment 110 can operate in a WLAN mode on the WLAN network. At this point, the user equipment may no longer receive subsequent CMAS alerts as long as it is connected solely to the WLAN network and this solution can be realized without any changes to the WLAN or carrier networks; only the user equipment firmware may change.

Figure 5:
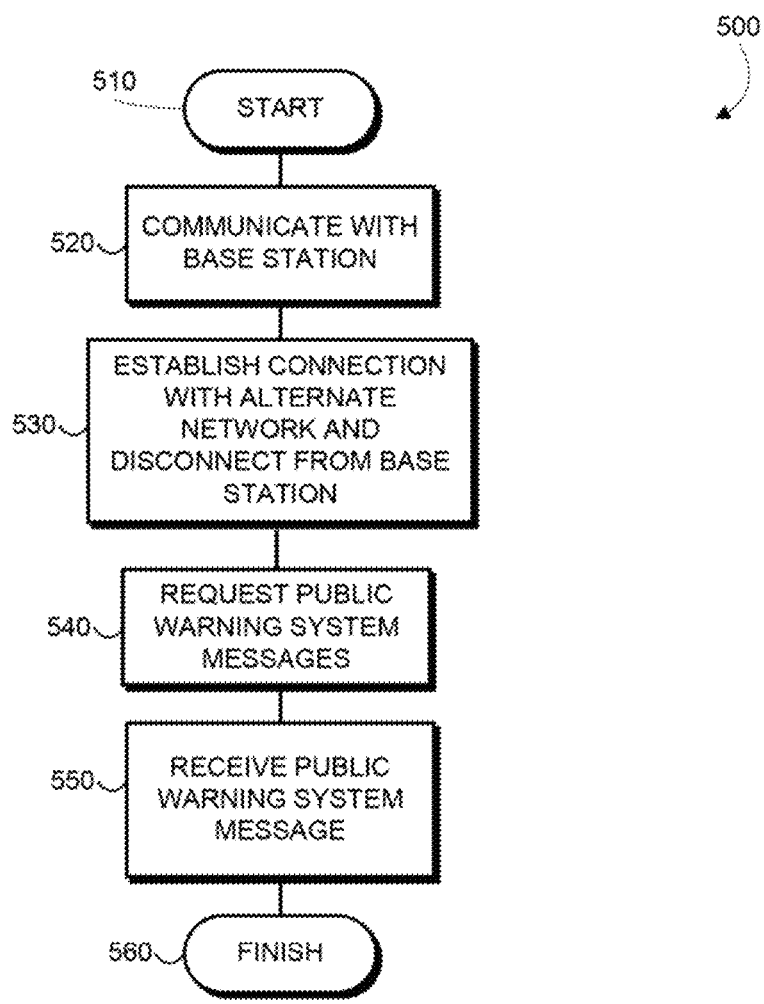
FIG. 5 is an example flowchart illustrating a method of operation of user equipment according to a possible embodiment.

FIG. 5 is an example flowchart 500 illustrating a method of operation of the user equipment 200 according to a possible embodiment. At 510, the method begins. At 520, the method can include communicating with a base station of a cellular network. A cell identifier of the base station can be retrieved while communicating with the base station and before switching operation from the base station to an access point of an alternate network. The retrieved cell identifier can be retained while the user equipment 200 is attached to the alternate network. The user equipment 200 can also store and update cell identifiers of previous serving base stations along with alternate network identifiers corresponding to the cell identifiers of the previous serving base stations.

While communicating with the base station, the user equipment 200 can receive, from the cellular network, a resource identifier for public warning system messages, where the requested public warning system messages are identified using the resource identifier. The user equipment 200 may also generate the resource identifier that identifies the base station, or the resource identifier may be pre-programmed into the user equipment. The resource identifier can be a Uniform Resource Identifier (URI) that points to a server of the cellular network operator or a third party. For example, the resource identifier can be, a Uniform Resource Locator (URL) identifier, a Unified Resource Name (URN) identifier, or can be any other resource identifier that identifies requested information over internet protocol. URLs include a method such as File Transfer Protocol (FTP) or Hyper-Text Transfer Protocol (HTTP), possible path and attribute information. The resource identifier can include a cell identifier (cell ID), coded as a path or attribute element, of a most recently used base station or of a base station that is identified as proximal to an access point of an alternate network. The resource identifier can be available from message alerting, can be from a template filled in with elements of the alert, can be based on consequences of a last message received, and can be otherwise obtained or constructed. For example, a public warning system message can include a public warning system message identifier that the user equipment 200 can use to access subsequent messages.

At 530, the method can include establishing a data connection with an alternate network with internet protocol connectivity, where the alternate network is an alternate to cellular networks. Establishing a connection can include switching operation of a user equipment from the cellular network to the alternate network by connecting to an access point of the alternate network and disconnecting from a base station of the cellular network. Switching operation can include handing over from the cellular network to the alternate network, reselecting from the cellular network to the alternate network, or otherwise switching operation from the cellular network to the alternate network.

At 540, the method can include requesting, over the alternate network, public warning system messages based on a cellular public warning system message protocol, where the requested public warning system messages are identified as identical, or equivalent to, or directly related to public warning system messages sent by the base station. For example, the messages sent by the alternate network can be formatted similarly to those sent by the cellular network. Alternately, the messages can be formatted slightly differently, such as with richer content, and can still contain the same information as messages sent by the cellular network. Public warning system messages can be identified as messages sent by a government entity authorized to issue public warning system messages. Requesting can include sending a query over the alternate network for public warning system messages that correspond to the base station, where the query includes a cell identifier of the base station. Requesting can also include sending multiple queries at a frequency based on a public warning system message recency timer. For example, the queries can be sent at regular intervals. A query can include a universal resource locator that includes the cell identifier of the base station. The query can also include a query address including a country code, and a network operator code, in addition to the cell identifier of the base station. The region code can be a country code, the network operator code can be a carrier code, and the cell identifier can be a global cell identifier. For example, user equipment can extract, using a modem that is active for communicating with the base station, values for a current region, such as a Mobile Country Code (MCC), a current carrier, such as a Mobile Network Code (MNC), and a cell identifier, such as a Global Cell Identifier (GCI). The user equipment 200 can identify the base station as a last former serving base station by logging network code, by a base station cell identifier, by location information, or by any other identifier that identifies a base station.

The user equipment 200 can request public warning system messages by sending a first query after a first time period after switching from the base station to an access point of the alternate network and by sending a second query after a second time period after sending the first query, where the second time period is longer than the first time period. For example, a frequency of queries over the alternate network can be decreased after first query. Alternately, the user equipment 200 can request public warning system messages by registering a query with a server in the alternate network, the query identifying a last former serving base station by logging network code, by the base station cell identifier, by location information, or by any other identifier that identifies a base station, and the query identifying a network address of the user equipment 200, and can receive from the server public safety warning messages as they become available.

The user equipment 200 can also request public warning system messages by sending public warning system message threshold settings that filter sent public warning system messages. For example, public warning system message threshold settings can be passed as filters in a query. The public warning system messages are filtered based on the severity of the public warning system messages, are filtered based on when the public warning system messages are issued, or are otherwise filtered. A URL accessing the carrier's web page can pass parameters reflective of the user's public warning system messages preferences for messages received over the cellular network, as well as other provisioned values. For example, a public warning system message user interface settings screen on a user's device can show that the user has disabled receipt of Amber alerts and weather alerts, but desires other alerts. A carrier of the cellular network can provision the user equipment 200 to request public warning system messages sent out within a predetermined time period, such as in the last 15 minutes. For example, a URL accessing the carrier's web page can contain Common Gateway Interface (CGI) parameters that can be passed along so that a web query can retrieve public warning system messages alerts sent in the last 15 minutes, with a severity level of "severe" or higher. Java Server Page (.jsp), Active Server Page (.asp), or other web protocols can also be used along with, or instead of, CGI.

At 550, the method can include receiving a public warning system message at the user equipment 200, where the public warning system message are received based on a cellular public warning system message protocol. For example, if a public warning system message is available, it can be retrieved in an Extensible Markup Language (XML) format similar or identical to a Common Alerting Protocol (CAP) database schema used for public warning system message alerts, can be retrieved in a text format, or can be retrieved in any other format that can be used for a public warning system message.

According to a possible implementation, while communicating with the base station in 520, the user equipment 200 can receive a public warning system message corresponding to the base station. The user equipment 200 can then start a public warning system message retrieval countdown timer in response to receiving the public warning system message. Then, the user equipment can request at 530, over the alternate network, public warning system messages that correspond to the base station at a first interval while the countdown timer is active and can request, over the alternate network, public warning system messages that correspond to the base station at a second interval while the countdown timer is inactive. For example, a frequency of queries for public warning system messages over the alternate network can be decreased from a frequency of queries over the cellular network after first timer expires.

According to a possible implementation, the user equipment 200 can power down after communicating with the base station of the cellular network at 520. The user equipment 200 can then power up and connect to an access point of the alternate network at 530 before connecting to a base station, such as a former serving base station or another base station, of the cellular network. The user equipment 200 can then request at 540, over the alternate network, public warning system messages that correspond to a stored cell identifier of the base station that is indexed with a stored alternate network identifier of the access point. For example, if the user equipment 200 powers up and goes immediately to alternate network mode, the user equipment 200 can write, into its internal non-volatile memory, such as into a database, a set of ordered pairs containing, for each alternate network, Service Set Identifier (SSID), the corresponding MCC, MNC, and GCI parameters last detected before moving to the alternate network, or the first MCC, MNC, and GCI parameter set detected when moving from the alternate network to a cellular network.

According to another possible implementation, the user equipment 200 can receive, over the cellular network, a cellular network public warning system message. The user equipment 200 can display the cellular network public warning system message. The user equipment 200 can receive, over the alternate network, an alternate network public warning system message corresponding to the base station. The user equipment 200 can then display the alternate network public warning system message from the alternate network in an identical manner to displaying the cellular network public warning system message. At 560, the flowchart 500 can end.

Figure 6:
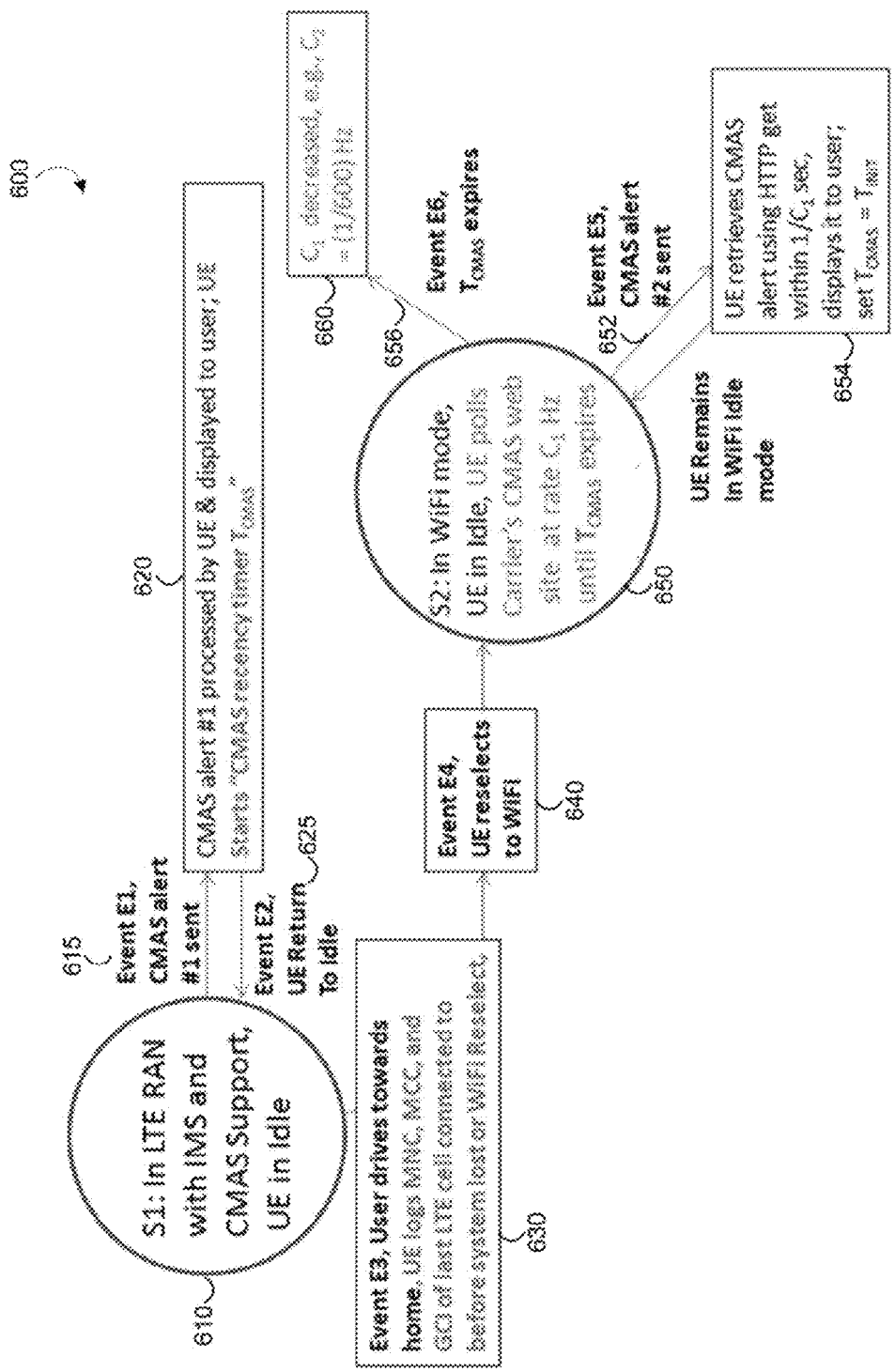
FIG. 6 is an example state diagram illustrating operation of a system according to a possible embodiment.

FIG. 6 is an example state diagram 600 illustrating operation of the user equipment 110 according to a possible embodiment. At 610, in state S1, the user equipment 110 can operate on a Long Term Evolution (LTE) Radio Access Network (RAN), such as when connected to the CMSP Network Infrastructure 180. The LTE RAN can have public warning system message, such as CMAS, support and can have Internet Protocol (IP) Multimedia Subsystem (IMS) support. The user equipment 110 can be in idle mode or in an active state.

At 615, in event E1, a first CMAS alert can be sent by the RAN and can be received by the user equipment 110. At 620, the user equipment 110 can process and display the first CMAS alert and can start a CMAS recency timer $T_{CMAS}$. The CMAS recency timer can be a countdown timer with an initial value $T_{INIT}$, such as a value in a 20-120 minute range, as value in a 30-60 minute range, or any other useful value. The CMAS recency timer can be reset whenever a new CMAS message is received from the RAN. At 625, in event E2, the user equipment 110 can return to an idle mode or an active state on the LTE RAN.

At 630, in event E3, a user can drive home with the user equipment 110 and can detect an accessible home WLAN network, such as a network of the access point 160, when pulling into a driveway of the home while the CMAS recency timer has not yet expired. The user equipment 110 can log the MNC, the MCC, and the GCI of the last LTE cell it has connected to before losing LTE RAN coverage and/or before switching to the WLAN network. At 640, the user equipment 110 can switch, such as reselect or hand over, to the WLAN network.

At 650, while connected to the WLAN network, the user equipment 110 can poll a carrier's CMAS web site, such as a web site of the LTE RAN carrier, at a predetermined frequency until the CMAS recency timer expires. For example, the user equipment 110 can poll the web site at a rate of $C_1$ Hz. The polling rate $C_1$ can be 0.01 to 0.1 Hz, such as every 10-100, seconds or can be any other useful polling rate. The user equipment 110 can use a web site URL in the form of http://CMAS/MCC-MNC/GCI, or can poll a carrier web site, server, or database in any other useful manner to access CMAS messages corresponding to a selected cell and/or base station.

At 652, in event E5, a second CMAS alert can be sent by an alert provider. At 654, the user equipment 110 can retrieve the CMAS from the web site when polling the web site at the polling rate $C_1$. The user equipment 110 can also reinitialize the CMAS recency timer $T_{CMAS}$ to an initial value $T_{INIT}$ and remain connected to the WLAN network in an idle or active mode. At 656, in event E6, the CMAS recency timer can expire. Then, at 660, the user equipment 110 can decrease a polling rate to a second frequency $C_2$, such as 1/600 Hz.

Figure 7:
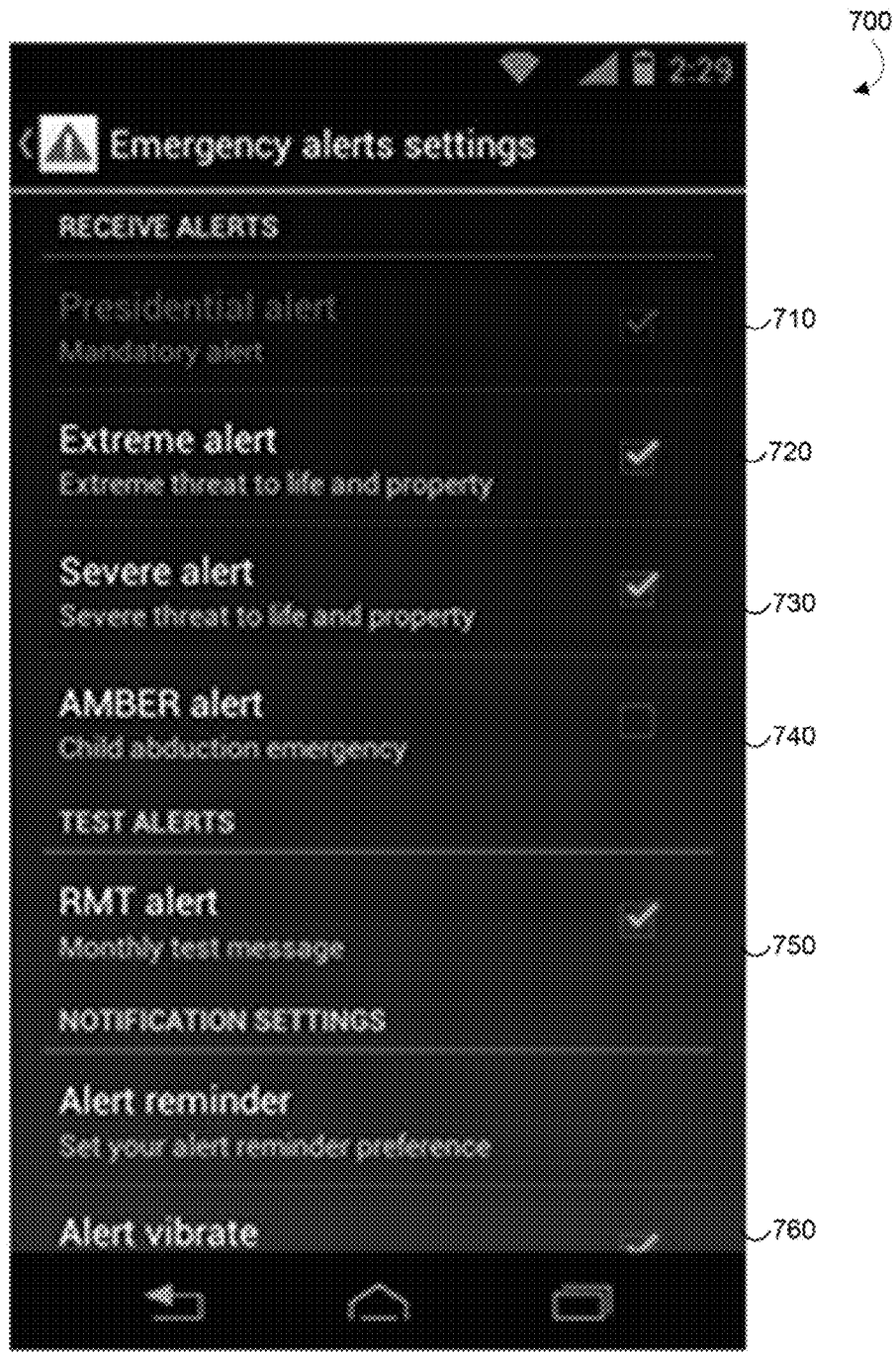
FIG. 7 is an example illustration of a user interface according to a possible embodiment.

FIG. 7 is an example illustration of a user interface 700 according to a possible embodiment. The user interface 700 can be accessed on the display 240 of the user equipment 200. The user interface 700 can show, and can allow a user to modify, selected alerts that a user desires to receive. For example, the user can automatically receive presidential alerts 710. The user can choose to receive extreme alerts 720, severe alerts 730, and Required Monthly Test (RMT) alerts 750, by selecting the alerts on the user interface 700. The user can opt out of receiving Amber alerts 740 by deselecting the alert, as shown. The user can also select alert reminder preferences, such as by selecting an alert vibrate setting 760 or other alert reminder preferences.

Figure 8:
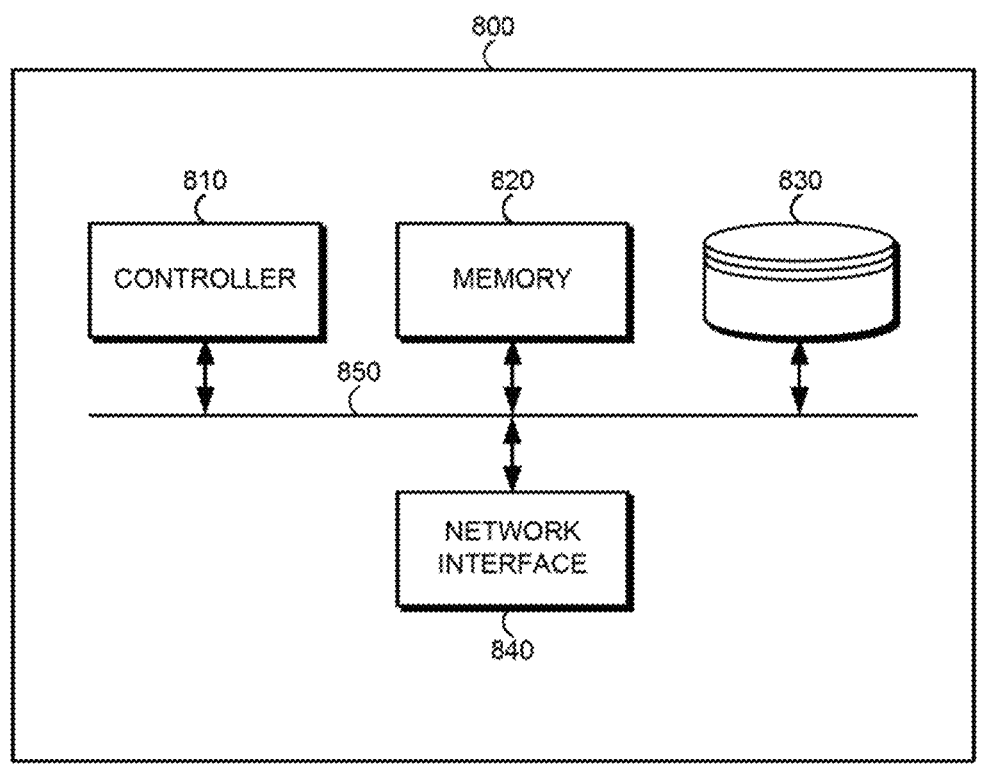
FIG. 8 is an example block diagram of a network controller according to a possible embodiment.

FIG. 8 is an example block diagram of a network controller 800 according to a possible embodiment. The network controller 800 can be the network controller 150, can be located at the access point 160, or can be located elsewhere on the network 140. The network controller 800 can include a controller 810, a memory 820, a database interface 830, a network interface 840, and a bus 850. The network controller 800 may implement any operating system, such as Microsoft Windows®, UNIX, or LINUX, for example. Network controller operation software may be written in any programming language, such as C, C++, Java or Visual Basic, or other programming languages. The network controller software may run on an application framework, such as, for example, a Java® server, a .NET® framework, or any other application framework.

The controller 810 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, a programmable logic array, a field programmable gate-array, or the like. In general, the controller 810 may be any controller or processor device or devices capable of operating a network controller and implementing the disclosed embodiments.

The memory 820 may include volatile and nonvolatile data storage, including one or more electrical, magnetic, or optical memories, such as a Random Access Memory (RAM), cache, hard drive, or other memory device. The memory 820 may have a cache to speed access to specific data. The memory 820 may also be connected to a Compact Disc-Read Only Memory (CD-ROM), Digital Video Disc-Read Only memory (DVD-ROM), DVD read write input, tape drive, thumb drive, or other removable memory device that allows media content to be directly uploaded into a system. Data may be stored in the memory 820 or in a separate database. For example, the database interface 830 may be used by the controller 810 to access a separate database. The network interface 840 may be connected to a communication device, a modem, a network interface card, a transceiver, or any other device capable of transmitting and receiving signals to and from the network 140. The components of the network controller 800 may be connected via the bus 850, may be linked wirelessly, or may be otherwise connected.

The network interface 840 can configured to collect public warning system messages that are to be transmitted over a wireless local area network. The controller 810 can identify one or more public warning system messages of the collected public warning system messages as a message relevant to a service area of the wireless local area network. The controller 810 can send the one or more identified public warning system messages over the wireless local area network via group transmission, where the group transmission transmits the identified public warning system message to a group of recipients using group addressed messages. For example, the controller 810 can send the identified public warning system messages over the wireless local area network using the access point 160.

For example, the controller 810 can identify public warning system messages relevant to at least one access point of a plurality of access points of the wireless local area network service area, and can send the identified public warning system message from the at least one access point via group transmission. The controller 810 can identify public warning system messages representative of a wireless wide area network public warning system delivery area relevant to the corresponding public warning system messages. The controller 810 can send the identified public warning system message with a Broadcast Media Access Control (MAC) address. The controller 810 can also send the identified public warning system message from at least one wireless local area network access point via broadcast transmission.

The controller 810 can additionally send the identified public warning system message from at least one wireless local area network access point via multicast transmission. For example, the controller 810 can receive a join request from a user equipment, where the join request can be a request to receive multicast transmissions of public warning system messages. The user equipment can be automatically joined for messages relevant to a service area of the wireless local area network. The join request can be a request to receive multicast transmissions of public warning system messages relevant to an area outside of the service area of the wireless local area network. The join request can be a request to receive multicast transmissions of a subset of different types of public warning system messages. The controller 810 can determine that all users receiving multicast public warning system messages have left the service area, and can discontinue the multicast if all users receiving the multicast public warning system messages have left.

According to another related embodiment, the network interface 840 can receive broadcast messages for transmission over a wireless local area network. The controller 810 can identify one or more broadcast message relevant to a service area of the wireless local area network.

The controller 810 can repeatedly transmit an enhanced broadcast indication message that indicates a delivery time and an identifier of a future broadcast message. For example, the controller 810 can repeatedly transmit the enhanced broadcast indication message at a predetermined countdown interval. The predetermined countdown interval can be based on a priority of the identified future broadcast message. The controller 810 can also repeatedly transmit the enhanced broadcast indication message at a first predetermined countdown interval, can increase the first predetermined countdown interval to a second predetermined countdown interval after a predetermined time after receiving the broadcast message, and can repeatedly transmit the enhanced broadcast indication message at the second predetermined countdown interval. The predetermined time can be based on a number of transmissions of enhanced broadcast indication message at the first predetermined countdown interval. The enhanced broadcast indication message can be repeatedly transmitted a predetermined number of times. The enhanced broadcast indication message can also be repeatedly transmitted at a predetermined interval based on a countdown timer. The controller 810 can repeatedly transmit the enhanced broadcast indication message until an expiration of the broadcast message.

The controller 810 can broadcast the identified future broadcast message over a wireless local area network access point at the delivery time after repeatedly transmitting the enhanced broadcast indication message. The controller 810 can broadcast the identified future broadcast message over the wireless local area network to a group of recipients using group addressed messages. The controller 810 can broadcast the identified future broadcast message at a scheduled delivery traffic information message beacon based on the delivery time in the enhanced broadcast indication message. The controller 810 can also repeatedly broadcast the identified future broadcast message over the wireless local area network access point at predetermined broadcast interval. The controller 810 can increase the predetermined broadcast interval after a predetermined period of time based on an age of the identified future broadcast message. The controller 810 can also broadcast the identified future broadcast message by multicasting the identified future broadcast message over the wireless local area network access point to a group of recipients that have requested receiving messages of a type of the identified future broadcast message via multicast transmission.

Figure 9:
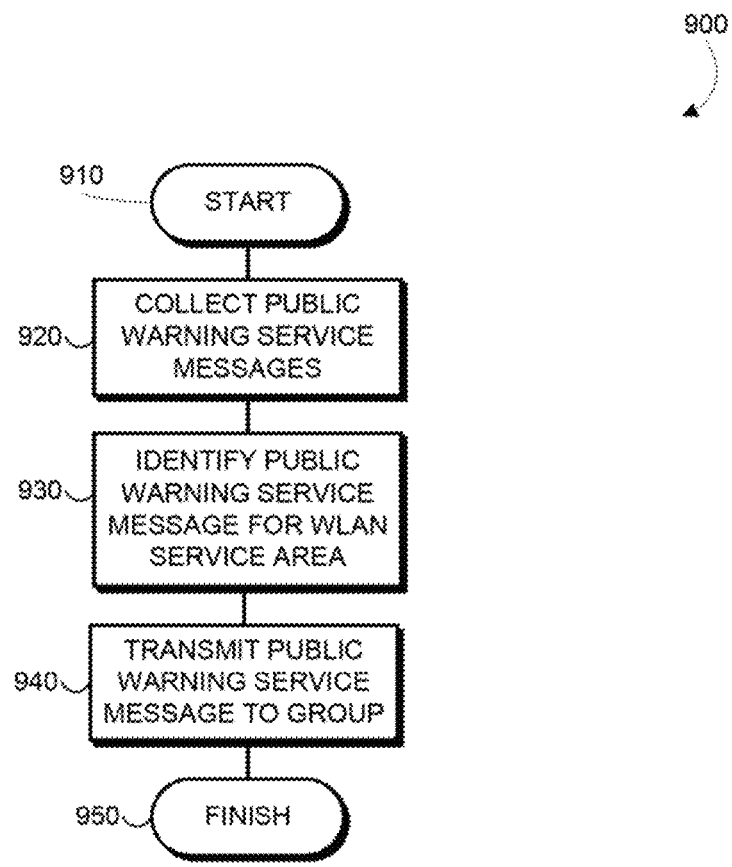
FIG. 9 is an example flowchart illustrating a method of operation of a network controller according to a possible embodiment

FIG. 9 is an example flowchart 900 illustrating a method of operation of the network controller 800 according to a possible embodiment. At 910, the method can begin. At 920, the method can include collecting public warning system messages that are to be transmitted over a wireless local area network.

At 930, the method can include identifying one or more public warning system messages of the collected public warning system messages as a message relevant to a service area of the wireless local area network. For example, the public warning system messages can be identified by selecting messages, or filtering messages for, messages that provide warnings for users in the service area of the wireless local area network. Identifying can include identifying public warning system messages relevant to at least one access point of a plurality of access points of the wireless local area network service area. For example, the messages can be identified based on locations of access points, such as based on location information identifying access points as being in a particular region, such as in a shopping mall, an airport, a county, a store, or other particular region. The messages can also be identified based on various severities, priorities, or types of messages, such as based on amber alerts, missing person alerts, presidential alerts, weather alerts, and other public warning system messages. The priority of the messages that would be accepted by the filter or otherwise selected can be configurable. Also, the priority of the messages themselves can be set by the issuing authorities. The access point location can be used to determine if a user equipment is in the targeted region. The access point can have a fixed location based on Global Positioning System (GPS) data, based on address information, based on a location of a commercial entity that has installed the access point, or based on other location information.

Identifying can also include identifying public warning system messages representative of a wireless wide area network public warning system delivery area relevant to the corresponding public warning system messages. For example, the system 100 can emulate CMAS, ETWS, KPAS, or other public warning system distribution target areas. A resolution of the relevant geographic area can be narrowed down or broadened, or granularity can be otherwise adjusted.

At 940, the method can include transmitting the one or more identified public warning system messages over the wireless local area network via group transmission, where the group transmission transmits the identified public warning system message to a group of recipients using group addressed messages. Transmitting can include transmitting the identified public warning system message from the at least one access point via group transmission. Transmitting can also include transmitting the identified public warning system message with a broadcast Media Access Control (MAC) address. For example, public warning system message notifications can be delivered using a WLAN broadcast paradigm. A message can be queued up for delivery by each access point and can be delivered with an appropriate broadcast MAC address. As a further example, group addressed messages can have Broadcast Media Access Control (MAC) addresses, Internet Protocol (IP) multicast addresses, broadcast addresses, Internet Relay Chat (IRC) addresses, Protocol for SYnchronous Conferencing (PSYC) addresses, or other group addresses.

Transmitting can also include transmitting the identified public warning system message from at least one wireless local area network access point via broadcast transmission. For example, the public warning system messages can be identified by filtering the messages for just messages relevant to the access point coverage area.

In another embodiment, transmitting can further include transmitting the identified public warning system message from at least one wireless local area network access point via multicast transmission, where the access point can act as a router for the multicast public warning system messages where different multicast addresses can be used to represent messages from different geographic areas or service levels. For example, a join request can be received from a user equipment, where the join request can be a request to receive multicast transmissions of public warning system messages associated with messages with a specific severity level. The join request can be a request to receive multicast transmissions of a subset of different types of public warning system messages.

A distribution network can automatically join relevant multicast services, such as those for public warning messages covering the local area, to be automatically distributed within the service area of the wireless local area network. For example, automatic joins can be received for a region covered by a distribution environment, such as an access point coverage area. Based on this default service set, a user equipment can then place a join request to receive multicast transmissions of public warning system messages relevant to an area outside of the service area of the wireless local area network. For example, following the join request for another service area the user equipment may expect delivery of public warning system messages for both a local area and at least one other desired area. According to this implementation, a user may desire public warning system messages for a travel destination area, for areas of family members, or for other areas of interest outside of a local coverage area. Local public warning system messages can be broadcast and alternate area messages can be unicast or multicast. Additionally, a user can request his user equipment to disable display or alerting of some local area messages and just get desired alternate area messages for which it has joined. This can allow a user to explicitly opt out of certain messages.

When multicasting, the controller 800 can determine how many user equipments have joined specific multicast addresses representing specific service levels or geographic areas of public warning system messages. When the controller 800 determines that all such user equipments requesting a specific address have left the service area it can then discontinue multicasting messages associated with that address. The controller 800 can continue delivery of messages for the default local service area and severities and not take into account whether user equipment joined or not. For example, multicast transmissions of specific alternate area messages can stop if all users requesting support for that alternate area leave and are no longer associated with the service area access points. Additionally, the controller 800 can time a user equipment out and update any multicast joins it may have made, if the user equipment leaves the service area of coverage without notifying the local access point.

As a further example, since multicast delivery is dependent upon the registered devices, access points and supporting networks can keep track of the devices and their service locations. As devices move between serving access points the network can maintain a list of registered services to be delivered into each access point service area. Similarly, as devices move out of coverage and are effectively removed from the service area, the associated service requests can be adjusted. To elaborate, access points can keep track of the multicast joins made by the user equipment. A network can track and adjust the effective joins to the specific access points which are associated with the specific user equipment devices as they move from access point to access point. At 950, the flowchart 900 can end.

Figure 10:
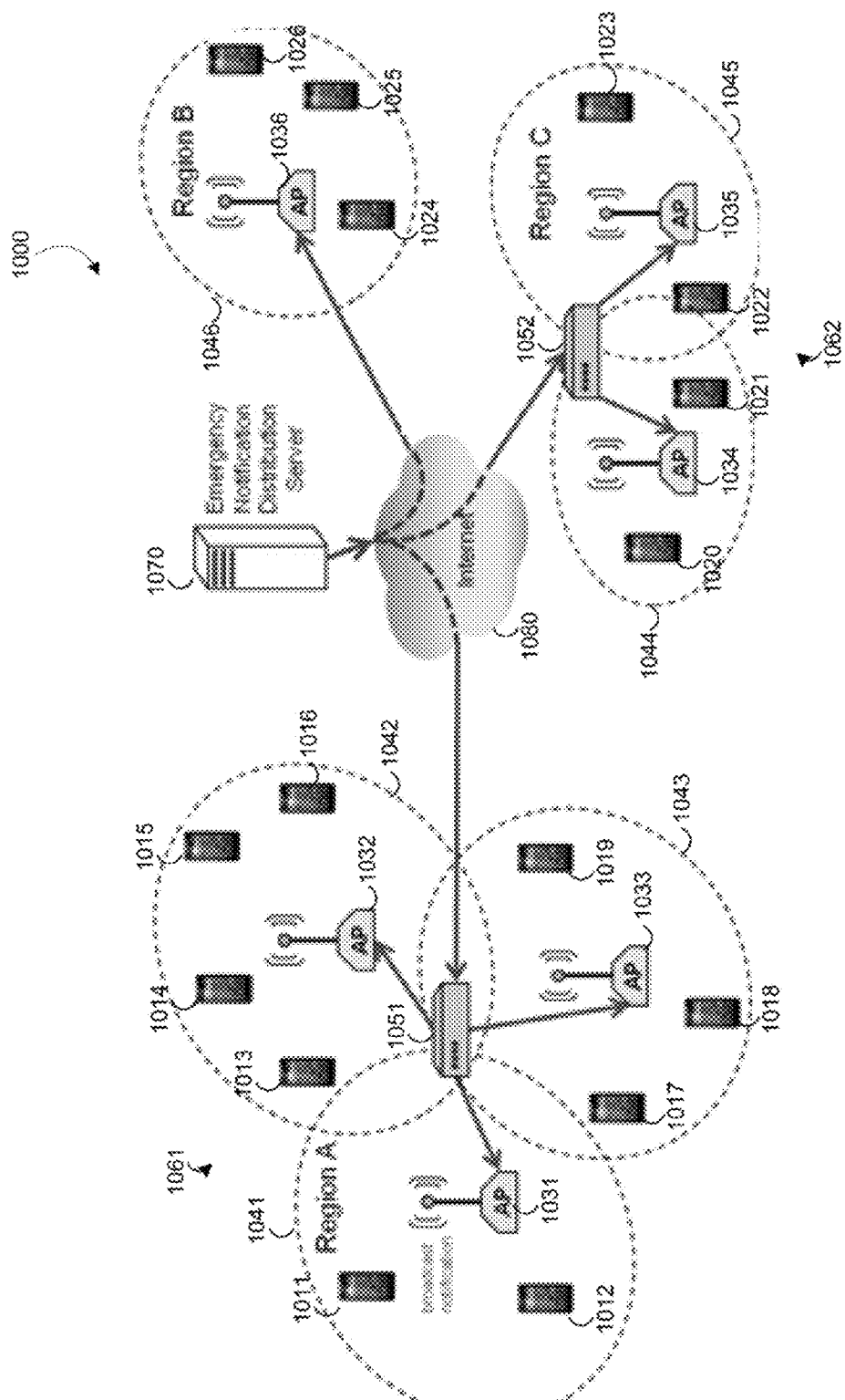
FIG. 10 is an example illustration of a system according to a possible embodiment.

FIG. 10 is an example illustration of a system 1000, such as portion of the system 100, according to a possible embodiment. The system 1000 can include a plurality of user equipment 1011-1026, such as the user equipment 200. The system 1000 can include a plurality of access points 1031-1036 that can cover a plurality of coverage areas 1041-1046, respectively. The system 1000 can also include a wireless network controller 1051 that can control access points 1031-1033 for a region, such as a service area, 1061 and can include a wireless network controller 1052 that can control access points 1034 and 1035 for a region 1062. A region can also correspond to a coverage area 1046 of a single access point 1036. For example, a region can be a WLAN network. The system 1000 can additionally include an emergency notification distribution center 1070, and a network 1080, such as the Internet.

The system 1000 can integrate public warning system message support into WLAN networks, such as the regions 1061, 1062, and 1046, and/or the coverage areas 1041-1046. For example, user equipment 1011 can access CMAS messages delivered by an IEEE 802.11 network 1061 using IEEE 802.11 broadcast for CMAS notification delivery without necessarily having been recently connected to a wide area RAN, such as LTE. CMAS messages can be queued up for delivery by each access point 1031-0136 and delivered with an appropriate broadcast Media Access Control (MAC) address. User equipment capable and interested in the messages in a given area can receive the messages and can provide alerting and display actions for the users.

To avoid broadcasting data that is not viable for a delivery area, the CMAS messages can be filtered for location relevance. This filtering can be done at various level of granularity. For example, a wireless network controller 1051 can collect CMAS messages for its region 1061 and can have each access point 1031-1033 in the region 1061 broadcast the received notifications. Further filtering can be done based on each separate access point 1031-1033 location if the location of interest for a given public warning system message relates to small zones or regions, such as if the locations of interest differ for different terminals in an airport. Since WLAN broadcast is a one-to-many distribution scheme, the amount of radio resources utilized can be less than that which would be used for individual delivery. Also, given that WLAN distribution networks tend to cover limited area, such as an airport, a shopping mall, a conference center, or other limited area, localized information sources can reuse the delivery model. For example, an airport can use the same delivery scheme to send out gate changes or weather alerts for locations of outgoing flights.

According to another possible embodiment, user equipment 1011 can access CMAS messages delivered by an IEEE 802.11 network 1061 using IEEE 802.11 multicast for CMAS notification delivery without necessarily having been recently connected to a wide area RAN, such as LTE. Multicast delivery can be similar to broadcast delivery except user devices can request or join specific services and notification classifications. User equipment can issue join requests for classifications of notifications of interest. An access point would not have to transmit notifications for which there are no interested user equipment, but it may have a selected set of default addresses that represent the local area or expected severity reports.

Each wireless network controller 1051 and 1052 or access point 1031-1036 can keep track of which access points have registered devices. When a CMAS message becomes available, the deliveries can occur in the zone where the registered user equipment are operating. The filtering of requests by region or access point can be similar to the broadcast approach.

Since multicast delivery is can be based upon the specific requests of the registered devices, the access points 1031-1036, network controllers 1051 and 1052, and supporting network can keep track of the user equipment and their service location. As user equipment move between serving access points, the system 1000 can to maintain the list of registered services to be delivered into each access point service area. Similarly, as user equipment move out of coverage and are effectively removed from the service area, the associated service requests can be adjusted. The access points 1031-1036 and network controllers 1051 and 1052 may only distribute data that has been requested by the user equipment in their corresponding service area and can avoid sending messages not requested by any user equipment.

Figure 11:
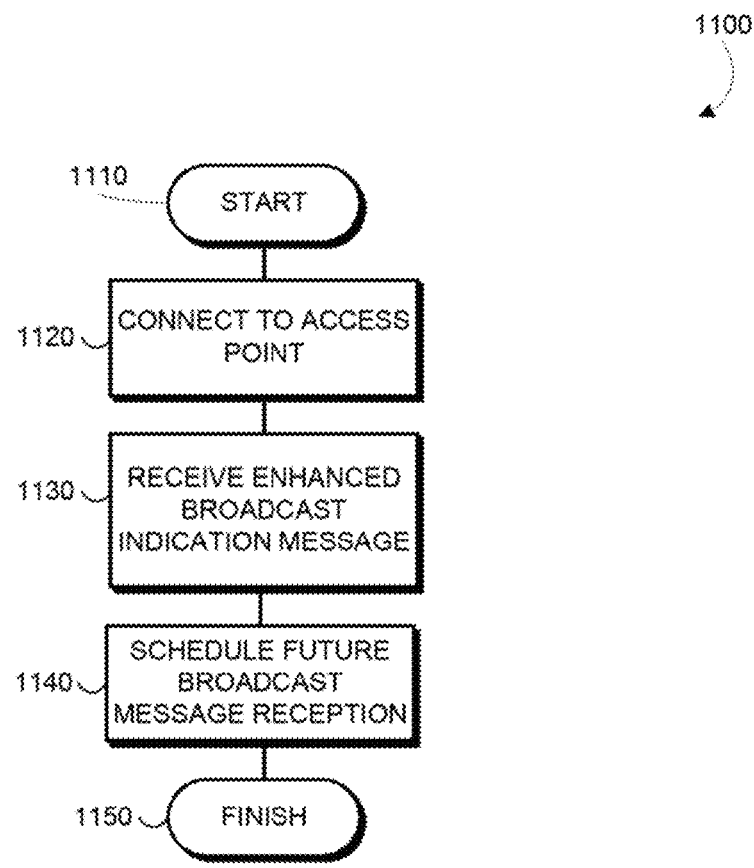
FIG. 11 is an example flowchart illustrating a method of operation of user equipment according to a possible embodiment.

FIG. 11 is an example flowchart 1100 illustrating a method of operation of the user equipment 200 according to a possible embodiment. At 1110, the method can begin. At 1120, the method can include connecting to a wireless local area network access point.

At 1130, the method can include receiving an enhanced broadcast indication message of a plurality of enhanced broadcast indication messages that indicate a delivery time and an identifier of a future broadcast message. The enhanced broadcast indication message can also provide a multicast address included in, or in addition to, the broadcast message identifier. The enhanced broadcast indication message can be received with an indication of a future delivery time. For example, the enhanced broadcast indication message can be an information element (IE) included in a beacon. The enhanced broadcast indication message can be a first enhanced broadcast indication message indicating the delivery time and the identifier of the future broadcast message. The user equipment 200 can receive a second enhanced broadcast indication message indicating the delivery time and the identifier of the same broadcast message and can ignore the second enhanced broadcast indication message.

At 1140, the method can include scheduling a time to receive the future broadcast message at a future delivery traffic information message beacon based on information in the enhanced broadcast indication message. The future broadcast message can be a multicast message and the user equipment 200 can send a join request to receive the multicast message. The future broadcast message can also be a public warning system message, an airport gate change notice message, a retail store announcement, a score update, or other broadcast messages.

For example, the enhanced broadcast indication message can be broadcast regularly to notify devices that a broadcast of a particular broadcast message will be occurring. The enhanced broadcast indication message can include a intended delivery address and a message identifier (ID) of the future broadcast message. The enhanced broadcast indication message can also include information about a future beacon after which the broadcast message is expected to be sent so the user equipment 200 can calculate when the beacon before the broadcast message will is expected to occur.

According to one implementation, the user equipment 200 can enter a power saving mode after receiving the enhanced broadcast indication message and can schedule a time to exit the power saving mode to receive the future broadcast message based on information in the enhanced broadcast indication message. The user equipment 200 can also enter a power saving mode before receiving the enhanced broadcast indication message indicating the presence of the future broadcast message, can exit the power saving mode, and can receive the enhanced broadcast indication message beacon indicating the delivery time and the identifier of the future broadcast message after exiting the power saving mode. Thus, the plurality of enhanced broadcast indication messages can allow the user equipment 200 to receive at least one enhanced broadcast indication message during a waking cycle of a power save mode.

According to a possible implementation, once the user equipment has received a broadcast message identified by its identifier and receives another enhanced broadcast indication, the message identifier in the enhanced broadcast indication can be used to determine if the indicated future broadcast message is a duplicate or not and schedule a wake-up if it a new broadcast message.

As a further example, as user equipment moves around and into service areas managed by different network equipment, the message identifier in the enhanced broadcast indications received in the new service area can continue to be used for duplicate detection. At 1150, the flowchart 1100 can end.

Figure 12:
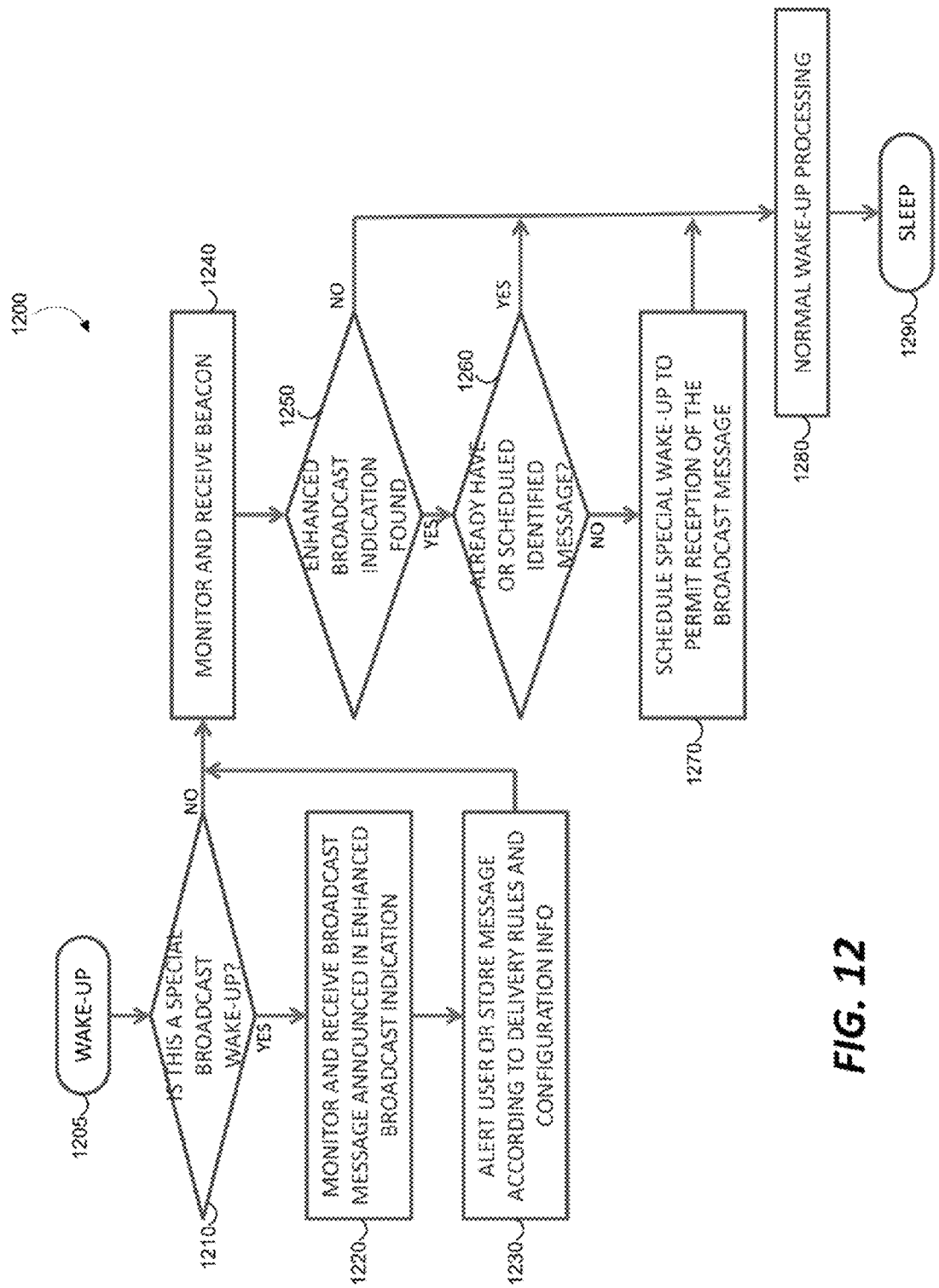
FIG. 12 is an example flowchart illustrating a method of operation of user equipment according to a possible embodiment.

FIG. 12 is an example flowchart 1200 illustrating a method of operation of the user equipment 200 according to a possible embodiment. For example, the flowchart 1200 illustrates a possible implementation of the flowchart 1100 of FIG. 11, where the flowchart 1100 can provide additional details about the elements of the flowchart 1200 and vice versa. At 1205, the user equipment 200 can wake up from a sleep mode or can be powered on. At 1210, the method can include determining whether the user equipment 200 has woken up for a special broadcast message. If so, at 1220, the method can include monitoring and receiving a broadcast message announced in an enhanced broadcast indication. At 1230, the method can include alerting a user or storing the message according to delivery rules and configuration information for the message.

At 1240, if the determination in 1210 is negative or after 1230, the method can include monitoring for and receiving a beacon. At 1250, the method can include determining whether an enhanced broadcast indication was found. If so, at 1260 the method can include determining whether the user equipment 200 already has the identified message or has scheduled for receiving the identified message. If the user equipment 200 does not have the identified message or has not scheduled for receiving the identified message, at 1270, the method can include scheduling a special wake up to permit reception of the broadcast message. If the determination at 1250 is negative, if the determination at 1260 is positive, or after 1270, the method can include the user equipment 200 performing normal wake up processing. At 1290, the user equipment 200 can enter a sleep mode, such as to conserve power.

Figure 13:
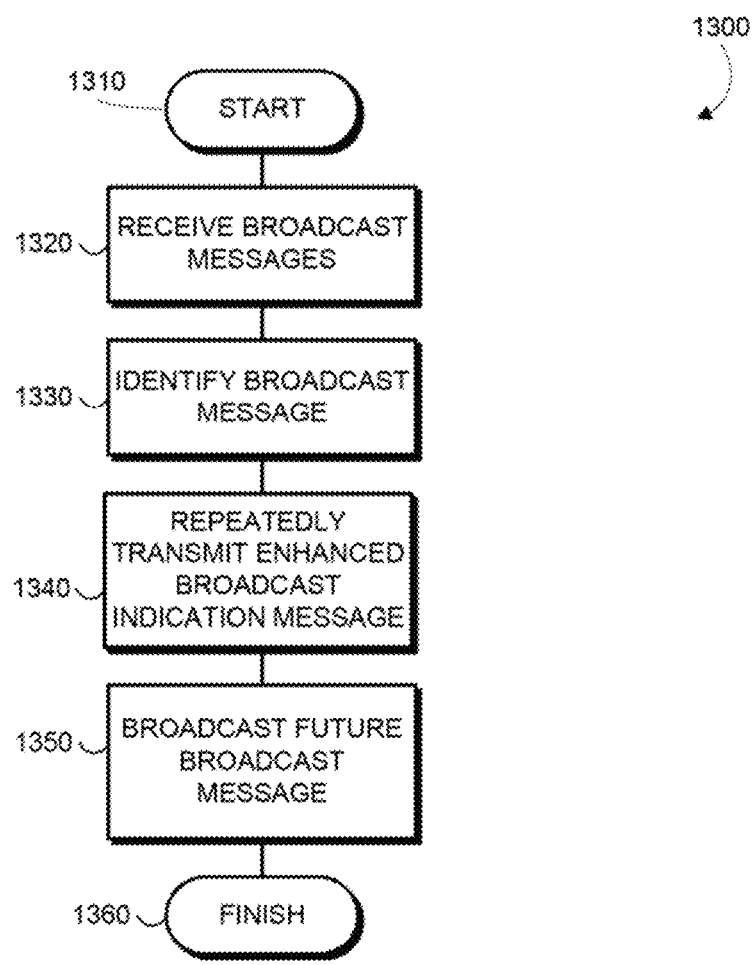
FIG. 13 is an example flowchart illustrating a method of operation of the network controller according to a possible embodiment.

FIG. 13 is an example flowchart 1300 illustrating a method of operation of the network controller 800, such as an access point network controller, according to a possible embodiment. At 1310, the method begins. At 1320, the method can include receiving broadcast messages for transmission over a wireless local area network. At 1330, the method can include identifying one or more broadcast message relevant to a service area of the wireless local area network.

At 1340, the method can include repeatedly transmitting an enhanced broadcast indication message that indicates a delivery time, an intended message address and an identifier of a future beacon following which the broadcast message will be transmitted to the service area. The enhanced broadcast indication message can be repeatedly transmitted with normally transmitted beacons a predetermined number of times. The enhanced broadcast indication message can also be repeatedly transmitted and refer to the same future planned delivery of the broadcast message by adjusting the predetermined beacon time, with such adjustment operating as a countdown value. For example, a countdown value can be used to signal the number of beacon transmissions that are to occur before the beacon before the broadcast message is planned to be sent. Thus, as each enhanced broadcast indication message repeatedly is prepared for transmission the countdown value can be decremented until it reaches zero after which the broadcast message can be prepared for transmission.

After the broadcast message is transmitted, a new cycle of repeated enhanced broadcast indication messages can be started after the countdown value is set to a predetermined value. The cycle may continue repeatedly until the broadcast message expiration.

The determination of the predetermined value for the countdown value can be based on a priority of the identified future broadcast message. For example, as types of data to be delivered may have different priorities and urgency, the countdowns and repeating intervals may be different. The enhanced broadcast indication message can be repeatedly transmitted at a first predetermined countdown interval. The first predetermined countdown interval can be increased to a second predetermined countdown interval after a predetermined time after transmitting the broadcast message. The predetermined time can be based on a number of transmissions of beacons which include the enhanced broadcast indication messages at the first predetermined countdown interval. The enhanced broadcast indication message can then be repeatedly transmitted at the second predetermined countdown interval.

At 1350, the method can include broadcasting the identified future broadcast message over a wireless local area network access point at the delivery time after repeatedly transmitting the enhanced broadcast indication message. Broadcasting can include broadcasting the identified future broadcast message at a scheduled delivery traffic information message beacon based on the delivery time in the enhanced broadcast indication message. Broadcasting can include broadcasting the identified future broadcast message over the wireless local area network to a group of recipients using group addressed messages. Broadcasting can also include repeatedly broadcasting the identified future broadcast message over the wireless local area network access point at predetermined broadcast interval. The predetermined broadcast interval can be increased after a predetermined period of time based on an age of the identified future broadcast message. Broadcasting can include multicasting the identified broadcast message over the wireless local area network access point to a group of recipients that have requested receiving messages of a type of the identified future broadcast message via multicast transmission. User equipment can be tracked to know which access points should send out which multicasts. At 1360, the flowchart 1300 can end.

Figure 14:
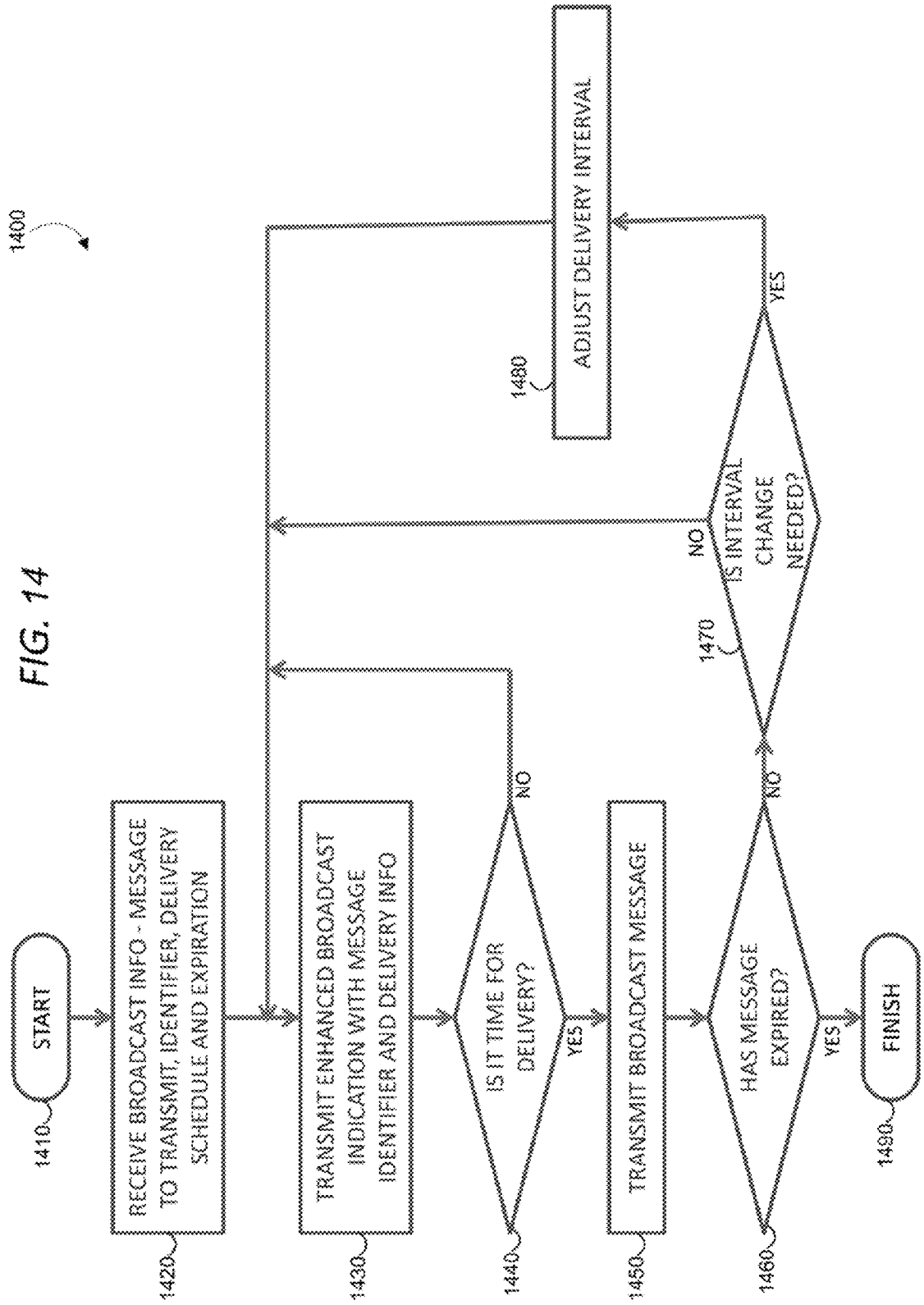
FIG. 14 is an example flowchart illustrating a method of operation of the network controller according to a possible embodiment.

FIG. 14 is an example flowchart 1400 illustrating a method of operation of the network controller 800 according to a possible embodiment. For example, the flowchart 1400 illustrates a possible implementation of the flowchart 1300 of FIG. 13, where the flowchart 1300 can provide additional details about the elements of the flowchart 1400 and vice versa. At 1410, the method begins. At 1420, the method can include receiving broadcast information including a message to transmit, an identifier of the message, a delivery schedule for the message, and/or an expiration time of the message. At 1430, the method can include transmitting an enhanced broadcast indication with the message identifier and delivery information. At 1440, the method can include determining whether it is time to deliver the message. If not, the method can return to 1430. If so, at 1450, the method can include transmitting the broadcast message. At 1460, the method can include determining whether the message has expired. If not, the method can return to 1430. If so, at 1480 the method can include adjusting a delivery interval for transmitting the enhanced broadcast indication and the method can return to 1430. If the message has expired, at 1490, the method can end.

Figure 15:
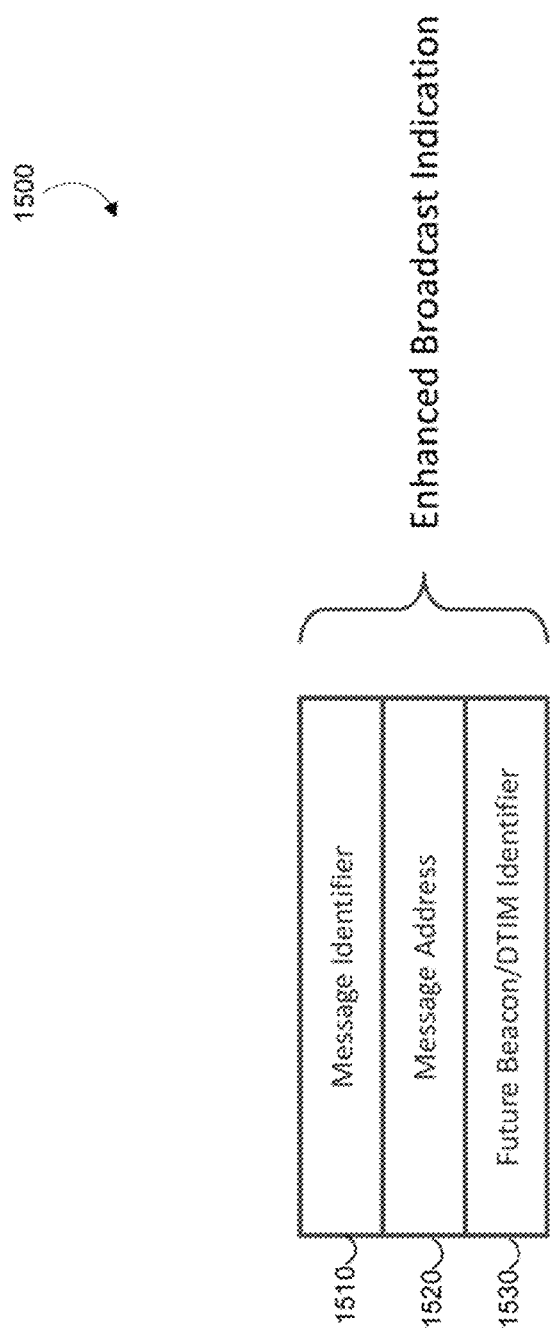
FIG. 15 is an example illustration of a representation of an enhanced broadcast indication according to a possible embodiment.

FIG. 15 is an example illustration of a representation of an enhanced broadcast indication 1500 according to a possible embodiment. The enhanced broadcast indication 1500 can include a message identifier 1510, a message address 1520, and an indication of its future delivery time 1530. The message identifier 1510 can be a fixed value that can permit user equipment to avoid duplicate messages. This identifier 1510 can be used in all delivery areas and each distinct message can have its own identifier. The message address 1520 can be an indication of the delivery address for the message. This can be used to determine if a multicast address, representing a non-local geographic area or specific message class, is of interest to a particular user equipment and thus, whether the particular user equipment would seek to acquire the message when it gets sent. The delivery time value 1530 can change over time as it can be used to represent a specific future beacon. This can be advisory to the user equipment so that the user equipment can make appropriate preparations to be awake and listening at the assigned time.

As the broadcast message may be repeated by a particular access point, there may be different times represented by the delivery time value 1530, but at any specific transmission the next transmission may be reported.

Also, as a broadcast message may be transmitted over many different access points, the delivery times may differ, as the reported time 1530 in a particular indication may be intended for delivery information for just the access point sending a specific enhanced broadcast indication.

Figure 16:
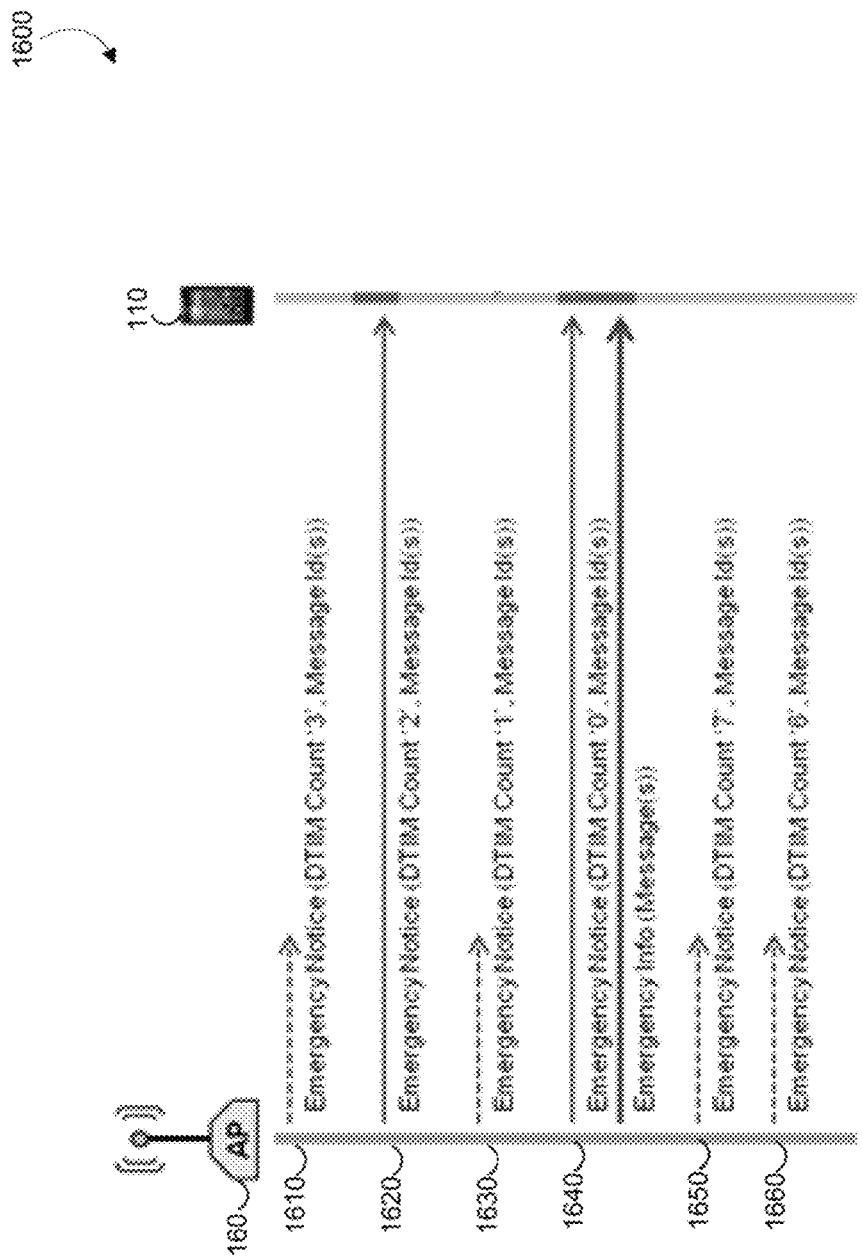
FIG. 16 is an example signal flow diagram illustrating signals sent from an access point to user equipment according to a possible embodiment.

FIG. 16 is an example signal flow diagram 1600 illustrating signals sent from the access point 160 to the user equipment 110 according to a possible embodiment. For example, the signal flow diagram 1600 illustrates example signals that can be used with the flowchart 1200 for different sleeping and waking modes of the user equipment 110. At 1610, the access point 160 can send a first enhanced broadcast indication message that indicates a delivery time and an identifier of one or more future broadcast message. For example, the access point 160 can send first emergency notice that includes a beacon countdown for the beacon after which the access point 160 will send a future emergency message. The user equipment 110 may be asleep in a power save mode when the first emergency notice is sent.

At 1620, the access point 160 can send a second emergency notice for the future emergency message. The user equipment 110 can wake from a power save mode at this point and can receive the second emergency notice. Upon receiving the notice, the user equipment 110 can schedule a wake up time to receive the emergency message based on the delivery time. For example, the user equipment 110 can wake up to receive the emergency message after the beacon indicated in the emergency notice. The user equipment 110 can then go back to sleep through a third emergency notice 1630. At 1640, the user equipment 110 can wake up, the access point 160 can send an emergency notice that the emergency message is being sent, and the access point 160 can send the emergency message. The user equipment 110 can receive and display information from the emergency message and can go back to sleep. At 1650 and 1660, the access point can continue to send emergency notices, such as until the emergency message is no longer relevant. The user equipment 110 may see the repeated emergency notices during its waking cycle. If the user equipment 110 determines the relevant emergency message has already been received, it can ignore the repeated emergency notices. Other user equipment entering a service area for the access point 160 can receive the repeated emergency notices to receive the emergency message or may filter out the emergency notices or messages if the emergency message was received elsewhere.

Figure 17:
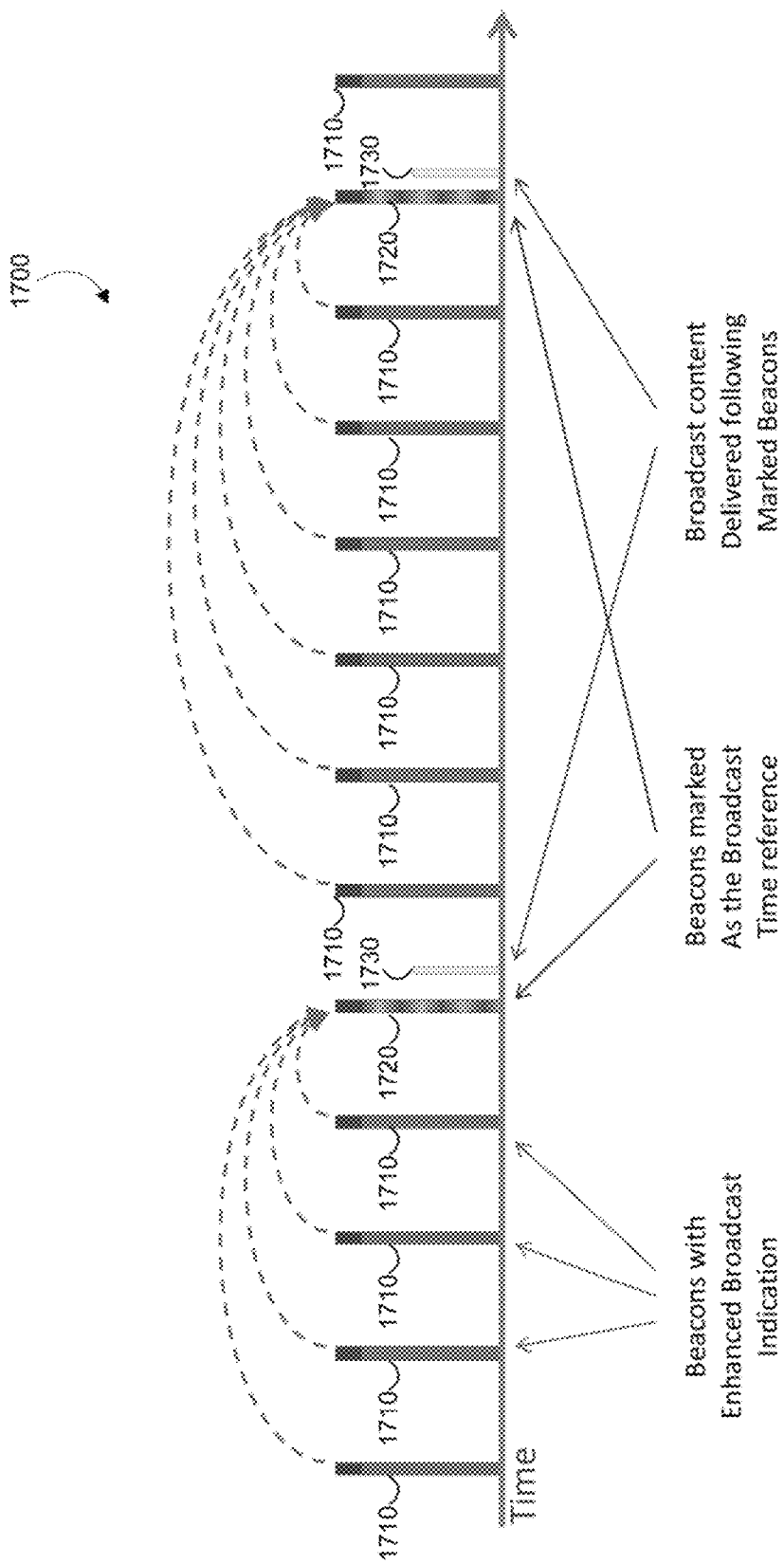
FIG. 17 is an example illustration of signals sent from an access point according to a possible embodiment.

FIG. 17 is an example illustration of signals 1700 sent from an access point, such as the access point 160, according to a possible embodiment. The signals 1700 can include beacons with enhanced broadcast indication 1710, such as the broadcast indication 1500, beacons marked as a broadcast time reference 1720, and broadcast content 1730 delivered following the marked beacons. The beacons with enhanced broadcast indication 1710 can indicate a delivery time and an identifier of one or more future broadcast message 1720. The beacon marked as a broadcast time reference 1720 can indicate that broadcast content is being sent, and the access point can send the broadcast content 1730 following the marked beacon 1720.

Although not required, embodiments can be implemented using computer-executable instructions, such as program modules, being executed by an electronic device, such as a general purpose computer. Generally, program modules can include routine programs, objects, components, data structures, and other program modules that perform particular tasks or implement particular abstract data types. The program modules may be software-based and/or may be hardware-based. For example, the program modules may be stored on computer readable storage media, such as hardware discs, flash drives, optical drives, solid state drives, CD-ROM media, thumb drives, and other computer readable storage media that provide non-transitory storage aside from a transitory propagating signal. Moreover, embodiments may be practiced in network computing environments with many types of computer system configurations, including personal computers, hand-held devices, multi-processor systems, microprocessor-based or programmable consumer electronics, network personal computers, minicomputers, mainframe computers, and other computing environments.

The methods of this disclosure is can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean at least one of, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method, performed by an electronic communication device, the method comprising:
   registering and communicating with a base station of a cellular network;
   establishing a data connection with an alternate network with internet protocol connectivity, where the alternate network is an alternate to cellular networks; and
   requesting, over the alternate network, public warning system messages associated with the base station.

2. The method according to claim 1, further comprising:
   switching operation of a user equipment from the cellular network to the alternate network by connecting to an access point of the alternate network and disconnecting from a base station of the cellular network.

3. The method according to claim 2, further comprising:
   retrieving a cell identifier of the base station before switching operation from the base station to an access point of the alternate network; and
   retaining the retrieved cell identifier while attached to the alternate network.

4. The method according to claim 1, wherein requesting comprises sending a query over the alternate network for public warning system messages that correspond to the base station, where the query includes a cell identifier of the base station.

5. The method according to claim 4, wherein the query includes a universal resource locator that includes the cell identifier of the base station.

6. The method according to claim 4, wherein the query includes a query address including a country code, and a network operator code.

7. The method according to claim 1, further comprising:
   receiving, from the cellular network, a resource identifier for public warning system messages, where the requested public warning system messages are identified using the resource identifier.

8. The method according to claim 1, further comprising:
   generating a resource identifier that identifies the base station, where the requested public warning system messages are identified using the resource identifier.

9. The method according to claim 1, further comprising receiving a public warning system message at a user equipment, where the public warning system message is received based on a cellular public warning system message protocol.

10. The method according to claim 1, wherein public warning system messages are identified as messages sent by a government entity authorized to issue public warning system messages.

11. The method according to claim 1, wherein the alternate network comprises a wireless local area network.

12. The method according to claim 1, wherein requesting comprises sending multiple queries at a frequency based on a public warning system message recency timer.

13. The method according to claim 1, further comprising:
    receiving a public warning system message corresponding to the base station; and starting a public warning system message retrieval countdown timer in response to receiving the public warning system message,
wherein requesting comprises requesting, over the alternate network, public warning system messages that correspond to the base station at a first interval while the countdown timer is active and requesting, over the alternate network, public warning system messages that correspond to the base station at a second interval while the countdown timer is inactive.

14. The method according to claim 1,
wherein requesting comprises sending a first query after a first time period after switching from the base station to an access point of the alternate network and sending a second query after a second time period after sending the first query, where the second time period is longer than the first time period.

15. The method according to claim 1, wherein requesting includes sending public warning system message threshold settings that filter sent public warning system messages.

16. The method according to claim 1, further comprising storing cell identifiers of previous serving base stations along with alternate network identifiers corresponding to the cell identifiers of the previous serving base stations.

17. The method according to claim 11, further comprising:
powering down after communicating with the base station of the cellular network; and
powering up and connecting to an access point of the alternate network before connecting to a base station of the cellular network, and
wherein requesting comprises requesting, over the alternate network, public warning system messages that correspond to a stored cell identifier of the base station that is indexed with a stored alternate network identifier of the access point.

18. The method according to claim 1, further comprising:
receiving, over the cellular network, a cellular network public warning system message;
displaying the cellular network public warning system message;
receiving, over the alternate network, an alternate network public warning system message corresponding to the base station; and
displaying the alternate network public warning system message from the alternate network in an identical manner to displaying the cellular network public warning system message.

19. An apparatus comprising:
a transceiver configured to communicate with a base station of a cellular network; and
an application processor configured to establish a data connection with an alternate network with internet protocol connectivity, using an alternate transceiver, where the alternate network is an alternate to cellular networks, and configured to request, over the alternate network, public warning system messages associated with the base station.

20. The apparatus according to claim 19, wherein the application processor is configured to retrieve a cell identifier of the base station before switching from the base station to an access point of the alternate network, and configured to retain the retrieved cell identifier while attached to the alternate network.

21. The apparatus according to claim 19, wherein the application processor is configured to request public warning system messages by sending a query over the alternate network for public warning system messages that correspond to the base station, where the query includes a cell identifier of the base station.

22. The apparatus according to claim 21, wherein the query includes a universal resource locator that includes the cell identifier of the base station.

23. The apparatus according to claim 21, wherein the query includes a query address including a country code, and a network operator code.

24. The apparatus according to claim 19, wherein the application processor is configured to receive, from the cellular network, a resource identifier for public warning system messages, where the requested public warning system messages are identified using the resource identifier.

25. The apparatus according to claim 19, wherein the application processor is configured to generate a resource identifier that identifies the base station, where the requested public warning system messages are identified using the resource identifier.

26. The apparatus according to claim 19, wherein the application processor is configured to request public warning system messages by sending multiple queries at a frequency based on a public warning system message recency timer.

27. The apparatus according to claim 19, wherein the application processor is configured to receive a public warning system message corresponding to the base station, configured to start a public warning system message retrieval countdown timer in response to receiving the public warning system message, and configured to request public warning system messages by requesting, over the alternate network, public warning system messages that correspond to the base station at a first interval while the countdown timer is active and by requesting public warning system messages that correspond to the base station at a second interval while the countdown timer is inactive.

28. The apparatus according to claim 19, wherein the application processor is configured to request public warning system messages by sending a first query after a first time period after switching from the base station to an access point of the alternate network and sending a second query after a second time period after sending the first query, where the second time period is longer than the first time period.

29. The apparatus according to claim 19, wherein the application processor is configured to request public warning system messages by sending public warning system message threshold settings that filter sent public warning system messages.

30. The apparatus according to claim 19, wherein the application processor is configured to store cell identifiers of previous serving base stations along with alternate network identifiers corresponding to the cell identifiers of the previous serving base stations.

31. The apparatus according to claim 19, wherein the application processor is configured to register on a web server to receive the public warning system messages as they become available.

32. The method according to claim 1, where requesting comprises registering on a web server to receive the public warning system messages as they become available.

* * * * *